(12) United States Patent
Wall et al.

(10) Patent No.: US 10,025,093 B2
(45) Date of Patent: Jul. 17, 2018

(54) WAVEGUIDE-BASED DISPLAYS WITH EXIT PUPIL EXPANDER

(71) Applicant: Microsoft Technology Licensing, LLC, Redmond, WA (US)

(72) Inventors: Richard Andrew Wall, Kirkland, WA (US); Tuomas Vallius, Espoo (FI); Mikko Juhola, Muurla (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 34 days.

(21) Appl. No.: 15/097,646

(22) Filed: Apr. 13, 2016

(65) Prior Publication Data

US 2017/0299860 A1    Oct. 19, 2017

(51) Int. Cl.
| | |
|---|---|
| G02B 27/10 | (2006.01) |
| G02B 27/00 | (2006.01) |
| G02B 27/01 | (2006.01) |
| F21V 8/00  | (2006.01) |
| G02B 3/00  | (2006.01) |
| G02B 3/04  | (2006.01) |

(52) U.S. Cl.
CPC ....... *G02B 27/0081* (2013.01); *G02B 3/0062* (2013.01); *G02B 3/04* (2013.01); *G02B 6/003* (2013.01); *G02B 6/0026* (2013.01); *G02B 27/0172* (2013.01); *G02B 2027/0118* (2013.01); *G02B 2027/0123* (2013.01)

(58) Field of Classification Search
CPC ............ G02F 1/29; G02B 27/00; G02B 27/81

USPC ............ 235/454; 359/626, 622, 633; 385/10
See application file for complete search history.

(56) References Cited

U.S. PATENT DOCUMENTS

| | | |
|---|---|---|
| 7,436,568 B1 | 10/2008 | Kuykendall |
| 7,460,305 B2 | 12/2008 | Powell et al. |
| 7,589,900 B1 * | 9/2009 | Powell ............... G02B 27/0927 359/622 |
| 7,613,373 B1 | 11/2009 | DeJong |
| 8,259,239 B2 | 9/2012 | Hua |
| 8,314,993 B2 | 11/2012 | Levola |
| 8,903,207 B1 | 12/2014 | Brown et al. |
| 2005/0248849 A1 | 11/2005 | Urey et al. |
| 2009/0237810 A1 | 9/2009 | Frazier et al. |
| 2010/0079861 A1 | 4/2010 | Powell |

(Continued)

OTHER PUBLICATIONS

Powell, et al., "Novel approach to exit pupil expansion for wearable displays", In Proceedings of SPIE, vol. 4711, Aug. 5, 2002, 3 pages.

(Continued)

*Primary Examiner* — Daniel Hess
(74) *Attorney, Agent, or Firm* — Arent Fox LLP

(57) ABSTRACT

A near eye or heads up display system includes a scan beam projector engine, an optical waveguide, and an exit pupil expander (EPE) optically coupled between the scan beam projector engine and the optical waveguide. The EPE improves the optical performance of the display system. The EPE could include a diffusive optical element, diffractive optical element, micro-lens array (MLA), or relay of aspherical lenses. A dual MLA EPE may have cells that prevent cross-talk between adjacent pixels. A dual MLA EPE may have a non-periodic lens array. The optical power of one MLA may be different from the other MLA.

18 Claims, 14 Drawing Sheets

(side view)

(56) References Cited

U.S. PATENT DOCUMENTS

| | | |
|---|---|---|
| 2012/0257282 A1 | 10/2012 | Hudman |
| 2013/0051730 A1 | 2/2013 | Travers et al. |
| 2013/0300999 A1 | 11/2013 | DeJong et al. |
| 2014/0140653 A1 | 5/2014 | Brown et al. |
| 2014/0225915 A1 | 8/2014 | Theimer et al. |
| 2015/0289762 A1 | 10/2015 | Popovich et al. |

OTHER PUBLICATIONS

Urey, Hakan, "Diffractive exit-pupil expander for display applications", In Journal of Applied Optics, vol. 40, Issue 32, Nov. 10, 2001, 3 pages.

Lewis, Jonathan, "What Microsoft's HoloLens announcement means for the AR industry", Published on: Feb. 3, 2015 Available at: http://trulifeoptics.com/blog/what-microsofts-hololens-announcement-means-for-the-ar-industry.

"International Search Report and Written Opinion Issued in PCT Application No. PCT/US2017/026258", Dated Jul. 6, 2017, 13 Pages.

Powell, et al., "Exit Pupil Expander: Image Quality Performance Enhancements and Environmental Testing Results", In Proceedings of SPIE, Helmet- and Head-Mounted Displays VIII: Technologies and Applications, Sep. 11, 2003, pp. 308-320.

\* cited by examiner

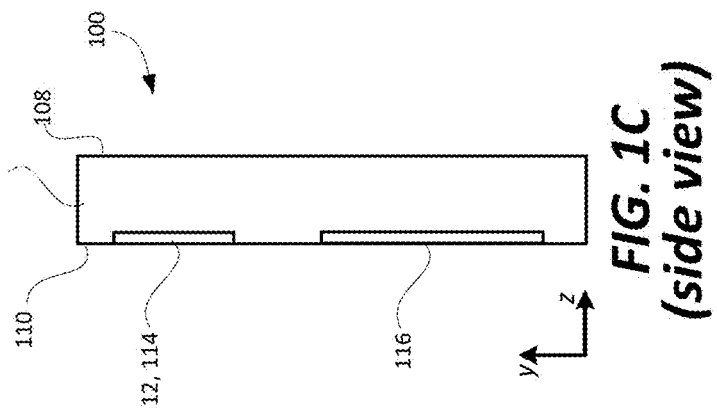
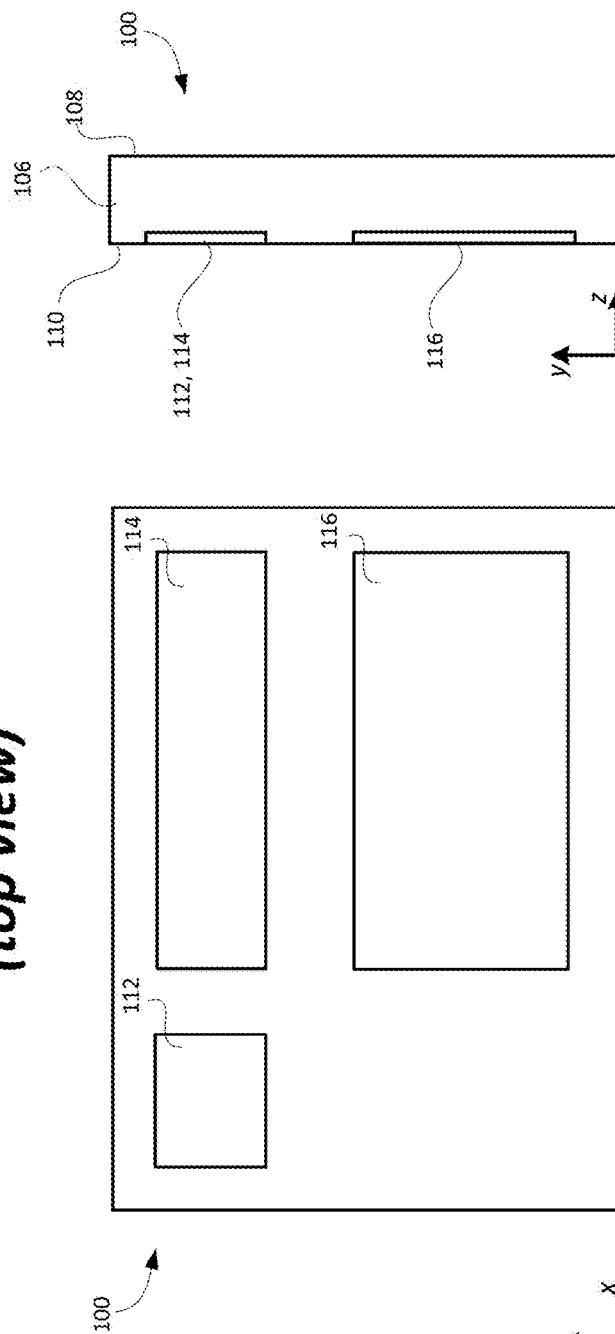

(side view)

*(front view)*

(side view)

*(front view)*

WAVEGUIDE-BASED DISPLAYS WITH EXIT PUPIL EXPANDER

BACKGROUND

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment.

These devices, which can be implemented as head-mounted display (HMD) glasses or other wearable near eye display devices, or as a heads up display, but are not limited thereto, often utilize optical waveguides to replicate an image, e.g., produced by a display engine, to a location where a user of a device can view the image as a virtual image in an augmented reality environment. As this is still an emerging technology, there are certain challenges associated with utilizing waveguides and/or other optical structures to display images of virtual objects to a user.

SUMMARY

Certain embodiments described herein relate to a near eye or heads up display system that includes a scan beam projector, an optical waveguide, and an exit pupil expander (EPE). The EPE may be configured to expand an exit pupil associated with the scan beam projector prior to delivering a light beam from the scan beam projector to the optical waveguide. The exit pupil expander improves optical performance of the display system.

In one embodiment, an apparatus comprises a scan beam projector configured to project a light beam, an optical waveguide, and an exit pupil expander optically coupled between the scan beam projector and the optical waveguide. The optical waveguide comprises a bulk-substrate, an input-coupler an output-coupler, and a diffractive optical element between the input-coupler and the output-coupler. The exit pupil expander is configured to couple the light beam from the scan beam projector into the input-coupler.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1A, 1B and 1C are front, top and side views, respectively, of an exemplary waveguide.

DETAILED DESCRIPTION

Figure 2A:
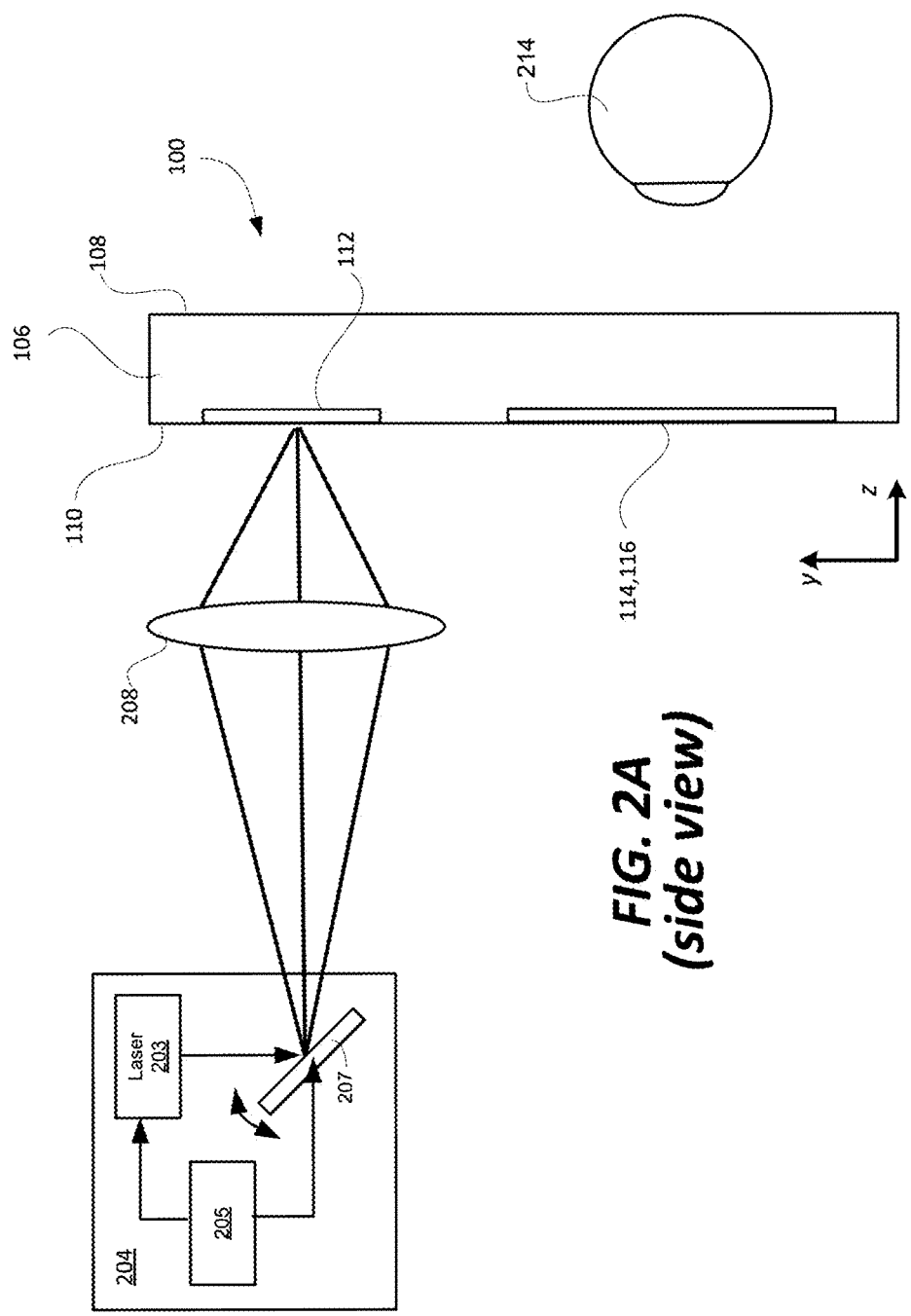
FIG. 2A is side view of an exemplary display system.

Certain embodiments of the present technology relate to a near eye or heads up display system that includes a scan beam projector, an exit pupil expander, and an optical waveguide. The exit pupil expander improves the optical performance of the display system.

Scan beam projectors (also known as light engines) are strong candidates for use in head mounted displays (HMD) due to their small size, low power requirements, and high brightness. It may be desirable to plane the scan beam projector pupil coincident at the entrance pupil of a waveguide or otherwise pupil replicating component. The conventional architecture of scan beam projectors, however, with a hermetically-sealed scan mirror for example, results in an internally-buried exit pupil that makes them hard to couple with other components that deliver the light to the user's eyes.

In addition, the mirror size in scan beam projectors is typically minimized to increase frame rate and scan angle, resulting in a small beam aperture that results in a small exit pupil. This small exit pupil presents challenges in using the scan beam projector in a near eye or heads up display system or the like.

The waveguide itself may serve as a pupil expander. However, when a scan beam projector is coupled with a waveguide pupil expander, the replicated pupil from the scan beam projector may result in an output intensity from the waveguide that suffers from the effects of an under-filled pupil distribution. This effect is discussed in more detail below with respect to FIG. 2B.

In one embodiment, an exit pupil expander is optically coupled between a scan beam projector and a waveguide. This may improve optical performance and may homogenize the pupil distribution in the waveguide. This improved optical performance of embodiments of a display system as discussed in more detail below with respect to FIG. 3B.

FIGS. 1A, 1B and 1C are front, top and side views, respectively, of exemplary planar optical waveguide 100 that can be part of a waveguide assembly that is used to replicate an image from a scan beam projector. The planar optical waveguide 100 will often be referred to hereafter more succinctly simply as an optical waveguide 100, or even more succinctly as a waveguide 100. The optical waveguide 100 may also be referred to as a pupil replication system.

Referring to FIGS. 1A, 1B and 1C, the planar optical waveguide 100 includes a bulk-substrate 106 having an input-coupler 112 and an output-coupler 116. The input-coupler 112 is configured to couple light corresponding to an image associated with an entrance pupil into the bulk-substrate 106 of the waveguide. The output-coupler 116 is configured to couple the light corresponding to the image associated with the entrance pupil, which travels in the planar optical waveguide 100 from the input-coupler 112 to the output-coupler 116, out of the waveguide 100 so that the light is output and imaged from an exit pupil.

The bulk-substrate 106, which can be made of glass or optical plastic, but is not limited thereto, includes a first major planar surface 108 and a second major planar surface 110 opposite and parallel to the first major planar surface 108. The first major planar surface 108 can alternatively be referred to as the front-side major surface 108 (or more simply the front-side surface 108), and the second major planar surface 110 can alternatively be referred to as the back-side major surface 110 (or more simply the back-side surface 110). As the term "bulk" is used herein, a substrate is considered to be "bulk" substrate where the thickness of the substrate (between its major surfaces) is at least forty times (i.e., 40×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major surfaces) is at least 24,800 nm, i.e., at least 24.8 µm. In accordance with certain embodiments, the bulk-substrate 106 has a thickness of at least 25 µm between its major planar surfaces 108 and 110. In specific embodiments, the bulk-substrate 106 has a thickness (between its major surfaces) within a range of 25 µm to 1000 µm. The bulk-substrate 106, and more generally the waveguide 100, is transparent, meaning that it allows light to pass through it so that a user can see through the waveguide 100 and observe objects on an opposite side of the waveguide 100 than the user's eye(s).

The planar optical waveguide 100 in FIGS. 1A, 1B and 1C is also shown as including an intermediate-component 114, which can alternatively be referred to as an intermediate-zone, a folding grating, or a folding component. Where the waveguide 100 includes the intermediate-component 114, the input-coupler 112 is configured to couple light into the waveguide 100 (and more specifically, into the bulk-substrate 106 of the waveguide 100) and in a direction of the intermediate-component 114. The intermediate-component 114 is configured to redirect such light in a direction of the output-coupler 116. Further, the intermediate-component 114 may be configured to perform one of horizontal or vertical pupil expansion, and the output-coupler 116 may be configured to perform the other one of horizontal or vertical pupil expansion. For example, the intermediate-component 114 can be configured to perform horizontal pupil expansion, and the output-coupler 116 can be configured to vertical pupil expansion. Alternatively, if the intermediate-component 114 were repositioned, e.g., to be below the input-coupler 112 and to the left of the output-coupler 116 shown in FIG. 1A, then the intermediate-component 114 can be configured to perform vertical pupil expansion, and the output-coupler 116 can be configured to perform horizontal pupil expansion. Such pupil expansion provides for an increased eye box, compared to if pupil expansion were not performed, thereby making the embodiments described herein practical for use in a near eye or heads up display. In certain embodiments, the intermediate-component is configured as a fold-grating. In other embodiments, the intermediate-component is a mirror based component, rather than a grating based component.

The input-coupler 112, the intermediate-component 114 and the output-coupler 116 can be referred to collectively herein as optical components 112, 114 and 116 of the waveguide, or more succinctly as components 112, 114 and 116.

It is possible that a waveguide includes an input-coupler and an output-coupler, without including an intermediate-components. In such embodiments, the input-coupler would be configured to couple light into the waveguide and in a direction toward the output-coupler. In one such embodiments the output-coupler can provide one of horizontal or vertical pupil expansion, depending upon implementation. The waveguide 100 is not required to provide pupil expansion, whether intermediate-component 114 is included or not.

In FIG. 1A, the input-coupler 112, the intermediate-component 114 and the output-coupler 116 are shown as having rectangular outer peripheral shapes, but can have alternative outer peripheral shapes. For example, the input-coupler 112 can alternatively have a circular outer peripheral shape, but is not limited thereto. For another example, the intermediate-component can have a triangular or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-coupler 112, the intermediate-component 114 and the output-coupler 116, which are not intended to be all encompassing.

As can best be appreciated from FIGS. 1B and 1C, the input-coupler 112, the intermediate-component 114 and the output-coupler 116 are all shown as being provided in or on a same surface (i.e., the back-side surface 110) of the waveguide 100. In such a case, the input-coupler 112 can be transmissive (e.g., a transmission grating), the intermediate-component 114 can be reflective (e.g., a reflective grating), and the output-coupler 116 can also be reflective (e.g., a further reflective grating). The input-coupler 112, the intermediate-component 114 and the output-coupler 116 can alternatively all be provided in the front-side surface 110 of the waveguide 100. In such a case, the input-coupler 112 can be reflective (e.g., a reflective grating), the intermediate-component 114 can be reflective (e.g., a further reflective grating), and the output-coupler 116 can also be transmissive (e.g., a transmission grating).

Alternatively, the input-coupler 112, the intermediate-component 114 and the output-coupler 116 can all be embedded (also referred to as immersed) in the bulk-substrate 106. For example, the bulk-substrate 106 can be separated into two halves (that are parallel to the major surfaces 108 and 110), and the input-coupler 112, the intermediate-component 114 and the output-coupler 116 can be provided in (e.g., etched into) one of the inner surfaces of the two halves, and the inner surfaces of the two halves can be adhered to one another. Alternatively, the bulk-substrate 106 can be separated into two halves (that are parallel to the major surfaces 108 and 110), and the input-coupler 112, the intermediate-component 114 and the output-coupler 116 can be provided between the inner surfaces of the two halves. Other implementations for embedding the input-coupler 112, the intermediate-component 114 and the output-coupler 116 in the bulk-substrate 106 are also possible, and within the scope of the embodiments described herein. It is also possible that one of the input-coupler 112, the intermediate-component 114 and the output-coupler 116 is provided in or on the front-side surface 108 of the waveguide 100, another one of the components 112, 114 and 116 is provided in or on the back-side surface 110, and the last one of the components 112, 114 and 116 is embedded or immersed in the bulk-substrate 106. More generally, unless stated otherwise, any individual one of the input-coupler 112, the intermediate-component 114 and the output-coupler 116 can be provided in or on either one of the major planar surfaces 108 or 110 of the bulk-substrate 106, or embedded therebetween.

The input-coupler 112, the intermediate-component 114 and the output-coupler 116 can each be implemented as a diffraction grating, or more generally, as a diffractive optical element (DOE). Such DOEs can be produced using holographic processes, in which case, the DOEs can be more specifically referred to as holographic optical elements (HOEs). The input-coupler 112 can alternatively be implemented as a prism, a reflective polarizer or can be mirror based. Similarly, the output-coupler 116 can alternatively be implemented as a prism, a reflective polarizer or can be mirror based. Depending upon the specific configuration and implementation, any one of the input-coupler 112, the intermediate-component 114 and the output-coupler 116 can be reflective, diffractive or refractive, or a combination thereof, and can be implemented, e.g., as a linear grating type of coupler, a holographic grating type of coupler, a prism or another type of optical coupler. The intermediate-component 114, as noted above, can be implemented using a fold-grating, or can alternatively be implemented as a mirror based pupil expander, but is not limited thereto. Where the input-coupler 112 is a diffraction grating, it can be referred to more specifically as an input diffraction grating 112. Where the intermediate-component 114 is a diffraction grating, it can be referred to more specifically as an intermediate diffraction grating 114. Similarly, where the output-coupler 116 is a diffraction grating, it can be referred to more specifically as an output diffraction grating 116.

A diffraction grating is an optical component that may contain a periodic structure that causes incident light to split and change direction due to an optical phenomenon known as diffraction. The splitting (known as optical orders) and angle change depend on the characteristics of the diffraction grating. When the periodic structure is on the surface of an optical component, it is referred to a surface grating. When the periodic structure is due to varying of the surface itself, it is referred to as a surface relief grating (SRG). For example, an SRG can include uniform straight grooves in a surface of an optical component that are separated by uniform straight groove spacing regions. Groove spacing regions can be referred to as "lines", "grating lines" or "filling regions". The nature of the diffraction by an SRG depends on the wavelength, polarization and angle of light incident on the SRG and various optical characteristics of the SRG, such as refractive index, line spacing, groove depth, groove profile, groove fill ratio and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mold or mask for manufacturing further optical components. An SRG is an example of a Diffractive Optical Element (DOE). When a DOE is present on a surface (e.g. when the DOE is an SRG), the portion of that surface spanned by that DOE can be referred to as a DOE area. A diffraction grating, instead of being a surface grating, can alternatively be a volume grating, such as a Bragg diffraction grating. It is also possible that one or more of the couplers are manufactured as SRGs and then covered within another material, e.g., using an aluminum deposition process, thereby essentially burying the SRGs such that the major planar waveguide surface(s) including the SRG(s) is/are substantially smooth. Such a coupler is one example of a hybrid of a surface and volume diffraction grating. Any one of the input-coupler 112, the intermediate-component 114 and the output-coupler 116 can be, e.g., a surface diffraction grating, or a volume diffraction grating, or a hybrid of a surface and volume diffraction grating. In accordance with embodiments described herein, each diffraction grating can have a preferential linear polarization orientation specified by a direction of the grating lines of the diffraction grating, wherein the coupling efficiency for light having the preferential linear polarization orientation will be higher than for light having a non-preferential linear polarization orientation.

Where the input-coupler 112, the intermediate-component 114 and/or the output-coupler 116 is an SRG, each such SRG can be etched into one of the major planar surfaces 108 or 110 of the bulk-substrate 106. In such embodiments, the SRG can be said to be formed "in" the bulk-substrate 106. Alternatively, each SRG can be physically formed in a coating that covers one of the major planar surfaces 108 or 110 of the bulk-substrate 106, in which case each such SRG can be said to be formed "on" the bulk-substrate 106. Either way, the components 112, 114 and 116 are considered parts of the waveguide 100.

Referring specifically to FIG. 1A, in an exemplary embodiment, the input-coupler 112 can have surface gratings that extend in a vertical (y) direction, the output-coupler 116 can have surface gratings that extend in a horizontal (x) direction, and the intermediate-component 114 can have surface gratings that extend diagonal (e.g., ~45 degrees) relative to the horizontal and vertical directions. This is just an example. Other variations are also possible and within the scope of embodiments of the present technology.

More generally, the input-coupler 112, the intermediate-component 114 and the output-coupler 116 can have various different outer peripheral geometries, can be provided in or on either of the major planar surfaces of the bulk-substrate, or can be embedded in the bulk-substrate 106, and can be implemented using various different types of optical structures, as can be appreciated from the above discussion, and will further be appreciated from the discussion below.

In general, light corresponding to an image, which is coupled into the waveguide via the input-coupler 112, can travel through the waveguide from the input-coupler 112 to the output-coupler 114, by way of total internal refection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ the critical angle for two optical mediums (e.g., the bulk-substrate 106, and air or some other medium that is adjacent to the bulk-substrate 106) that meet at a medium boundary, n1 is the index of refraction of the optical medium in which light is traveling towards the medium boundary (e.g., the bulk-substrate 106, once the light is couple therein), and n2 is the index of refraction of the optical medium beyond the medium boundary (e.g., air or some other medium adjacent to the bulk-substrate 106).

The concept of light traveling through the waveguide 100, from the input-coupler 112 to the output-coupler 114, by way of TIR, can be better appreciated from FIG. 4, which is discussed below.

As noted above, scan beam projectors (also known as light engines) are strong candidates for use in head mounted displays (HMD) due to their small size, low power requirements, and high brightness. FIG. 2A shows a side view of a scan beam projector 204, imaging lens 208, waveguide 100, and human eye 214.

The scan beam projector 204 includes a laser 203, control logic 205, and a scanning mirror 207. Briefly, the laser 203 may include a red laser, a green laser, and a blue laser. Other color lasers could be used. The laser could be a mono-color laser. The scanning mirror 207 may be a micro-electromechanical system (MEMS) scanning mirror. The control logic 205 may control the scanning mirror 207 and the laser 203. The light from the laser is relayed onto the scanning mirror 207 that scans the laser light into a raster pattern. The raster pattern from the scanning mirror 207 is relayed to imaging lens 208, which focuses the raster pattern onto the input-coupler 112.

The sealed scanning mirror 207 may result in an internally-buried exit pupil, which makes it difficult to couple to the waveguide 100. In addition, the mirror size of the scanning mirror 207 is typically minimized to increase resolution and frequency, resulting in a small beam aperture that results in a small exit pupil.

Figure 2B:
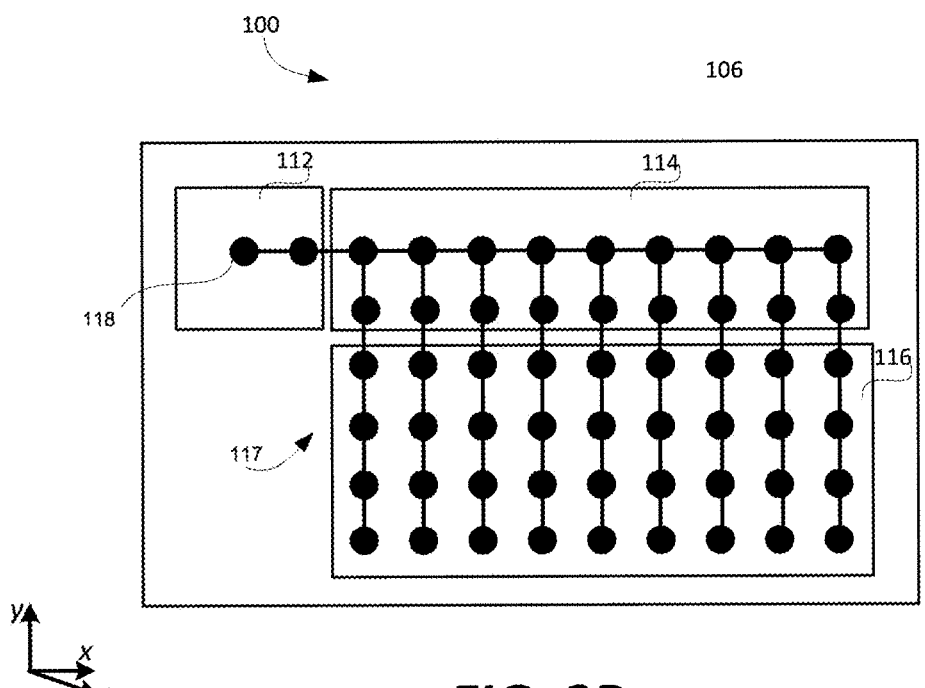
FIG. 2B shows a front view of the waveguide of FIG. 2A.

The small exit pupil can present problems when coupling the beam from the scan beam projector 204 to the input-coupler 112 of the waveguide 100. An exit pupil distribution 117 is depicted in waveguide 100 of FIG. 2B. The example pupil distribution in FIG. 2B is the result of coupling scan beam projector 204 to the input-coupler 112 of the waveguide 100, as depicted in FIG. 2A. However, the scan beam projector 204 is not depicted in FIG. 2B.

The pupil distribution 117 is depicted as a group of black circles, each of which represents a pupil as the light moves through the waveguide 100. The light from scan beam projector 204 enters input-coupler 112, as represented by pupil 118. Input-coupler 112 may diffract the light towards intermediate-component 114. Some of the light may travel in the general direction of the x-axis (by TIR) within the waveguide 100. Intermediate-component 114 may diffract a portion of the light in the general direction of the y-axis. Again, this diffracted light may travel by TIR within the waveguide to the output-coupler 116. A portion of this light may continue to travel in the general direction of the y-axis by TIR within the waveguide 100. Output-coupler 116 may diffract a portion of the light out of the waveguide 100. The light may be output in the general direction of the z-axis.

FIG. 2B depicts an under-filled pupil distribution, which may result from the small exit pupil of the scan beam projector 204. The small exit pupil of the scan beam projector 204 results in pupil 118 being relatively small. The under-filled pupil distribution is represented by the relatively small size of the pupils within the waveguide 100.

Figure 3A:
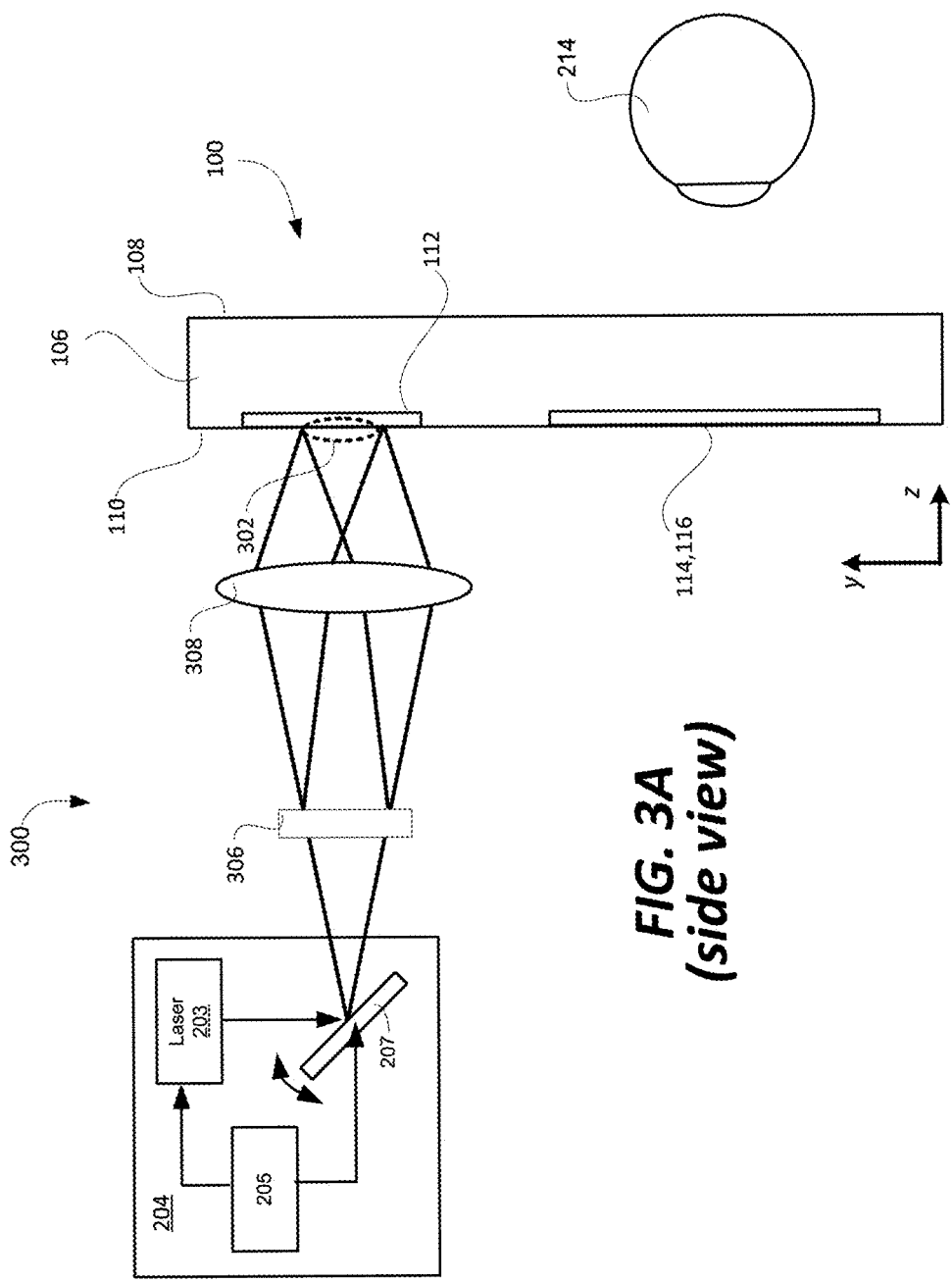
FIG. 3A shows one embodiment of a display system having an exit pupil expander optically coupled between the scan beam projector and the waveguide.

FIG. 3A shows one embodiment of a display system 300 having an exit pupil expander 306 optically coupled between the scan beam projector 204 and the waveguide 100. The exit pupil expander 306 may also be referred to as a numerical aperture (NA) convertor. There is an imaging lens 308 between the EPE 306 and waveguide 100. The exit pupil expander 306 provides an expanded exit pupil 302 prior to coupling to the waveguide 100, which increases overall system performance.

The scan beam projector 204 can include, e.g., red, green and/or blue light emitting elements that are configured to respectively produce red light within a corresponding red wavelength range, green light within a corresponding green wavelength range and blue light within a corresponding blue wavelength range. For a more specific example, one or more red light emitting elements can produce light within a red wavelength range (e.g., from 600 nm to 650 nm); one or more green light emitting elements can produce light within a green wavelength range (e.g., from 500 nm to 550 nm); and one or more blue light emitting elements can produce light within a blue wavelength range (e.g., from 430 nm to 480 nm). The waveguide 100 can transfer light corresponding to the image from an entrance pupil of the waveguide to an exit pupil of the waveguide, where the image can be viewed by for example, a human eye 214.

The exit pupil expander 306 may be manufactured in multiple diffractive or refractive forms including, but not limited to, ground glass or holographic diffusers, diffractive beamsplitters, engineered diffusers or non-periodic refractive elements, and microlens arrays (MLAs). FIGS. 5-9 show various embodiments of exit pupil expanders that may be used in FIG. 3A.

Note that in one embodiment, the waveguide 100 comprises intermediate diffractive element 114, as shown in FIG. 3A. In another embodiment, the waveguide 100 comprises input-coupler 112 and output coupler 116, but does not have intermediate diffractive element 114.

Figure 3B:
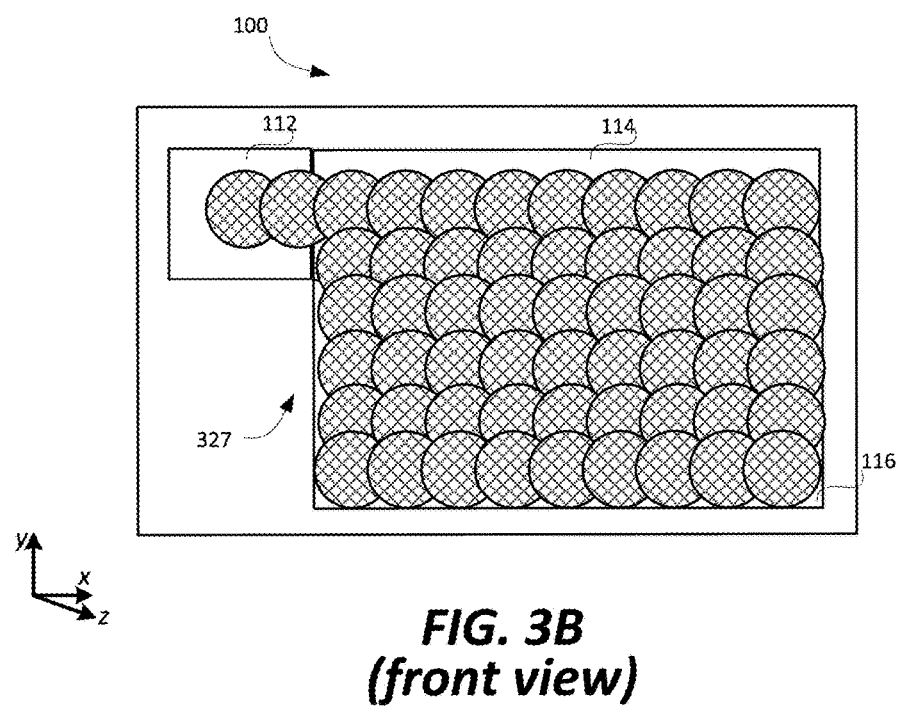
FIG. 3B depicts an example pupil distribution in waveguide of FIG. 3A.

FIG. 3B depicts an example pupil distribution 327 in waveguide 100 of FIG. 3A. The example pupil distribution 327 is represented by a number of circles, which are partially overlapping. FIG. 3B shows a front view of the waveguide of FIG. 3A. The example pupil distribution in FIG. 3B is the result of using an exit pupil expander 306 with the scan beam projector 204 and waveguide 100, as depicted in FIG. 3A. However, the scan beam projector 204 is not depicted in FIG. 3B. FIG. 3B shows that the pupil distribution in the waveguide 100 is homogenized, as a result of using the exit pupil expander 306. The light may travel through the waveguide 100 of FIG. 3B in a similar manner as described with respect to FIG. 2B.

Figure 4:
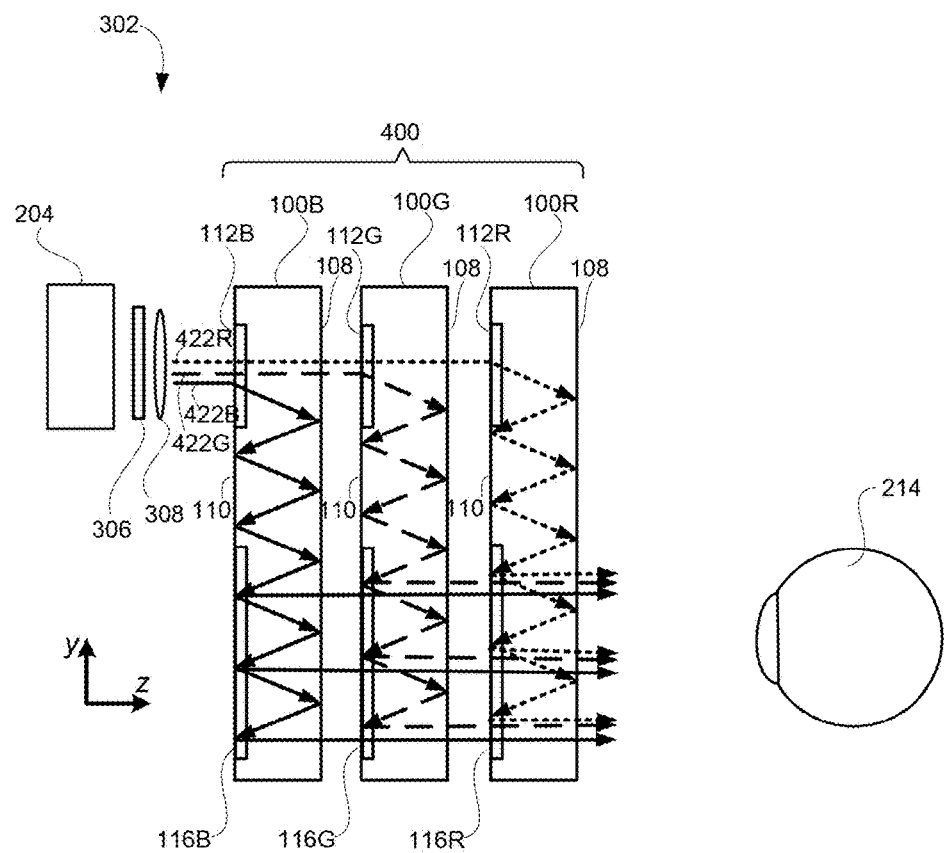
FIG. 4 is side view of a display system according to an embodiment of the present technology.

FIG. 4 is a diagram showing further details of one embodiment of a display system 302 having an exit pupil expander 306 between a scan beam projector 204 and waveguide 100. The display system 300 is shown as including three waveguides labeled 100R, 100G, 100B (each of which can be similar to the waveguide 100 introduced with reference to FIGS. 1A, 1B and 1C) and a scan beam projector 204 that generates an image including angular content that is coupled into the waveguides 100R, 100G and 100B by the input-couplers 112R, 112G and 112B.

FIG. 4 also shows an exit pupil expander 306 optically coupled between the scan beam projector 204 and the three waveguides 100R, 100G, 100B. Also depicted is an imaging lens 308 between the exit pupil expander 306 and the three waveguides 100R, 100G, 100B.

FIG. 4 also shows a human eye 214 that is viewing the image (as a virtual image) within an eye box that is proximate the output-couplers 116R, 116G and 116B. Explained another way, the human eye 214 is viewing the image from an exit pupil associated with the waveguides 100R, 100G and 100B. The display system 300 can be, e.g., a near eye display or a heads up display.

The waveguides 100R, 100G and 100B can be configured, respectively, to transfer red, green and blue light corresponding to an image from an entrance pupil to an exit pupil. More specifically, an input-coupler 112R of the waveguide 100R can be configured to couple light (corresponding to the image) within a red wavelength range into the waveguide 100R, and the output-coupler 116R of the waveguide 100R can be configured to couple light (corresponding to the image) within the red wavelength range (which has travelled from the input-coupler 112R to the output-coupler 116F by way of TIR) out of the waveguide 100R. Similarly, an input-coupler 112G of the waveguide 100G can be configured to couple light (corresponding to the image) within a green wavelength range into the waveguide 100G, and the output-coupler 116G of the waveguide 100G can be configured to couple light (corresponding to the image) within the green wavelength range (which has travelled from the input-coupler 112G to the output-coupler 116G by way of TIR) out of the waveguide 100G. Further, an input-coupler 112B of the waveguide 100B can be configured to couple light (corresponding to the image) within a blue wavelength range into the waveguide 100B, and the output-coupler 116B of the waveguide 100B can be configured to couple light (corresponding to the image) within the blue wavelength range (which has travelled from the input-coupler 112B to the output-coupler 116B by way of TIR) out of the waveguide 100B. In accordance with an embodiment, the red wavelength range is from 600 nm to 650 nm, the green wavelength range is from 500 nm to 550 nm, and the blue wavelength range is from 430 nm to 480 nn. Other wavelength ranges are also possible.

The waveguides 100R, 100G and 100B can be referred to collectively as the waveguides 100, or individually as a waveguide 100. Two or more of the waveguides 100 can be referred to as a waveguide assembly 400. More specifically, multiple waveguides 100 can be stacked, back-to-back, to provide the waveguide assembly 400. The distance between adjacent waveguides 100 of the waveguide assembly 400 can be, e.g., between approximately 50 micrometers (μm) and 300 μm, but is not limited thereto. While not specifically shown, spacers can be located between adjacent waveguides 100 to maintain a desired spacing therebetween. The input-couplers 112G, 112R and 112B can be referred to collectively as the input-couplers 112, or individually as an input-coupler 112. Similarly, the output-couplers 116G, 116R and 116B can be referred to collectively as the output-couplers 116, or individually as an output-coupler 116. While the waveguide assembly 400 is shown as including three waveguides 100, it is also possible that a waveguide assembly include more or fewer than three waveguides, as will be described in additional detail below.

Each of the input-couplers 112 have an input angular range, and each of the output-coupler 116 have an output angular range. In accordance with certain embodiments, all of the input-couplers 112 have substantially the same input angular range, and all of the output-couplers 116 have substantially the same output angular range. In accordance with certain embodiments, the input angular range for the input-couplers 112 is substantially the same as the output angular range for the output-couplers 116. Values are considered to be substantially the same if they are within 5% of one another. In accordance with certain embodiments, the input angular range and the output angular range are each approximately +/−15 degrees relative to the normal. Smaller or larger input and output angular ranges are also possible, and within the scope of embodiments described herein.

Each input-coupler 112 and output-coupler 116 of a waveguide 100 can have a preferential polarization orientation, wherein the coupling efficiency for light having the preferential polarization orientation will be higher than for light having a non-preferential polarization orientation. For example, where a coupler is a diffraction grating, the preferential polarization orientation may be specified by a direction of the grating lines of the diffraction grating. If the scan beam projector 204 is configured to output an image comprising light having a first linear polarization orientation, then the input-coupler 112 and the output-coupler 116 of one or more waveguides 100 (that is/are configured to transfer light corresponding to the image from an entrance pupil to an exit pupil, where the image can be viewed, and to perform pupil expansion) can be configured to have the first linear polarization orientation as its preferential linear polarization orientation.

The preferential polarization orientation of a coupler (e.g., 112 or 116) can be a linear polarization orientation, which can either be a P linear polarization orientation, or an S linear polarization orientation, which orientations are orthogonal relative to one another. It is also possible that the preferential linear polarization orientation of a coupler can be a polarization that is neither a P linear polarization orientation, nor an S linear polarization orientation, but rather, is a polarization orientation that is oriented somewhere between the S and P linear polarization orientations. The P linear polarization orientation is also known as transverse-magnetic (TM), and the S linear polarization orientation is also known as transverse-electric (TE). The input-coupler 112 and the output-coupler 116 of a waveguide 100 can have the same preferential linear polarization orientation. Alternatively, the input-coupler 112 and the output-coupler 116 of a waveguide 100 can have different preferential linear polarization orientations from one another, which may be the case, e.g., where the waveguide 100 includes in intermediate-component 114 that rotates the polarization of internally reflected light as the light travels within the waveguide from the input-coupler 112 to the intermediate-component 114, and then from the intermediate-component 114 to the output-coupler 116. It is also possible that a preferential polarization of one or more of the couplers is a circular polarization.

The imaging lens 308 is arranged to receive a display image from the EPE 306, to collimate and project the display image at a given defined field of view, and to form a pupil at the location of the input-couplers 112 of the waveguides 100, in one embodiment. Note that the pupil location is not required to be completely coincident with the input-couplers 112. Also note that imaging lens 308 is simplified. For example, imaging lens 308 could comprise more than one lens. Also, imaging lens 308 could include one or more lens between the scan beam projector 204 and the EPE 306.

In accordance with an embodiment, an entrance pupil associated with the waveguide may be approximately the same size as an exit pupil associated with the EPE 306, e.g., 5 mm in some embodiments, but is not limited thereto. Note that the entrance pupil associated with the waveguide may be substantially larger than an exit pupil associated with the scan beam projector 204.

FIG. 4 is not intended illustrate the precise locations of the scan beam projector 204 relative to the EPE 306. Rather, FIG. 4 is intended to illustrate that the EPE 306 utilizes light, generated by the scan beam projector 204, to produce an image. For example, various optical elements, such as lenses, mirrors, birdbath optics and/or beam splitters may be included between the scan beam projector 204 and the EPE 306.

Also, the imaging lens 308 is representative of one possible configuration between the EPE 306 and the waveguide 100. There may be a complex series of lenses between the EPE 306 and the waveguide 100.

Regardless of the exact configuration, eventually light associated with the image is caused to be incident on the input-couplers 112 of the waveguides 100, so that the light associated with the image can travel, by way of total internal reflection (TIR), from the input-couplers 112 to the output-couplers 116, where the light is output and imaged from an exit pupil by a human eye. When light exits the waveguide 100, proximate the output-couplers 116, a human eye, which has a lens in it, receives the collection of angles associated with a pupil and coverts it back to an image, e.g., the image produced by the scan beam projector 204 in FIG. 4.

As noted above in the discussion of FIGS. 1A-1C, each of the waveguides 100 can optionally include an intermediate-component 114 which may perform one of horizontal and vertical pupil expansion, and the output-coupler 116 can perform the other one of horizontal or vertical pupil expansion. Where the waveguides 100, and more specifically the components 114 and/or 116 thereof is/are configured to perform pupil expansion, then an expanded pupil (relative to the input at input coupler 112) is converted to an image by the lens of a human eye.

In FIG. 4, the scan beam projector 204 is shown as facing the back-side surface 110 of the waveguides 100, and the eye 214 is shown as facing the front-side surfaces 108 opposite and parallel to the back-side surfaces 110. This provides for a periscope type of configuration in which light enters the waveguides on one side of each waveguide 100, and exits the waveguides at an opposite side of each waveguide 100. Alternatively, each of the input-couplers 112 and the output-couplers 116 can be implemented in a manner such that the scan beam projector 204 and the eye 214 are proximate to and face a same major planar surface (108 or 110).

The waveguides 100 can be incorporated into a see-through mixed reality display device system (see, for example, FIG. 11), but is not limited to use therewith. A separate instance of each of the waveguide assemblies 400, the scan beam projector 204, and EPE 306 can be provided for each of the left and right eyes of a user. In certain embodiments, such waveguide assemblies 400 may be positioned next to or between see-through lenses, which may be standard lenses used in eye glasses and can be made to any prescription (including no prescription). Where a see-through mixed reality display device system is implemented as head-mounted display (HMD) glasses including a frame, the scan beam projector 204 can be located to the side of the frame so that it sits near to a user's temple. Alternatively, the scan beam projector 204 can be located in a central portion of the HMD glasses that rests above a nose bridge of a user. Other locations for the scan beam projector 204 are also possible. In these instances, the user can also be referred to as a wearer. Where there is a separate waveguide assembly 400 for each of the left and right eyes of a user, there can be a separate scan beam projector 204 for each of the waveguide assemblies 400, and thus, for each of the left and right eyes of the user.

The scan beam projector 204 can include red, green and/or blue light sources that are configured to respectively produce red light within a corresponding red wavelength range, green light within a corresponding green wavelength range and blue light within a corresponding blue wavelength range. For example, the light source assembly 210 can include red, green and blue light emitting diode (LEDs), super luminescent light emitting diodes (SLEDs), a quantum dot light emitting diodes (QD-LED), or laser diodes (LDs), but is not limited thereto. In accordance with an embodiment, the red wavelength range is from 600 nm to 650 nm, the green wavelength range is from 500 nm to 550 nm, and the blue wavelength range is from 430 nm to 480 nn, as noted above. Narrower or wider wavelength ranges are also possible.

In FIG. 4, the thick dotted arrowed line 422R is representative of red (R) light corresponding to an image that is output by the scan beam projector 204, the thick dashed arrowed line 422G is representative of green (G) light corresponding to the image that is output by the scan beam projector 204, and the thick solid arrowed line 422B is representative of blue (B) light corresponding to the image that is output by the scan beam projector 204. While the waveguides 100R, 100G and 100B are shown as being stacked in a specific order, the order in which the waveguides 100 are stacked can be changed.

When implemented as an input diffraction grating, the input-coupler 112B is designed to diffract blue light within an input angular range (e.g., +/−15 degrees relative to the normal) and within the blue wavelength range (e.g., from 430 nm to 480 nn) into the waveguide 100B, such that an angle of the diffractively in-coupled blue light exceeds the critical angle for the waveguide 100B and can thereby travel by way of TIR from the input-coupler 112B to the output-coupler 116B. Further, the input-coupler 112B is designed to transmit light outside the blue wavelength range, so that light outside the blue wavelength range (such as light within the green and red wavelength ranges) will pass through the waveguide 100B.

When implemented as an input diffraction grating, the input-coupler 112G is designed to diffract green light within an input angular range (e.g., +/−15 degrees relative to the normal) and within the green wavelength range (e.g., from 500 nm to 550 nm) into the waveguide 100G, such that an angle of the diffractively in-coupled green light exceeds the critical angle for the waveguide 100G and can thereby travel by way of TIR from the input-coupler 112G to the output-coupler 116G. Further, the input-coupler 112G is designed to transmit light outside the green wavelength range, so that light outside the green wavelength range (such as light within the red wavelength range) will pass through the waveguide 100G.

When implemented as an input diffraction grating, the input-coupler 112R is designed to diffract red light within an input angular range (e.g., +/−15 degrees relative to the normal) and within the red wavelength range (e.g., from 600 nm to 650 nm) into the waveguide 100R, such that an angle of the diffractively in-coupled red light exceeds the critical angle for the waveguide 100R and can thereby travel by way of TIR from the input-coupler 112R to the output-coupler 116R. Further, the input-coupler 112R is designed to transmit light outside the red wavelength range, so that light outside the red wavelength range will pass through the waveguide 100R.

More generally, each of the waveguides 100 can include an input-coupler 112 that is configured to couple-in light within an input angular range (e.g., +/−15 degrees relative to the normal) and within a specific wavelength range into the waveguide, such that an angle of the in-coupled light exceeds the critical angle for the waveguide 100 and can thereby travel by way of TIR from the input-coupler 112 to the output-coupler 116 of the waveguide 100, and such that light outside the specific wavelength range is transmitted and passes through the waveguide 100.

Referring still to FIG. 4, the solid thick arrowed lines shown within the waveguide 100B are representative of blue light traveling by way of TIR from the input-coupler 112B to the output-coupler 116B. The dashed thick arrowed lines shown within the waveguide 100G are representative of green light traveling by way of TIR from the input-coupler 112G to the output-coupler 116G. The dotted thick arrowed lines shown within the waveguide 100R are representative of red light traveling by way of TIR from the input-coupler 112R to the output-coupler 116R.

In FIG. 4 the solid thick arrowed lines directed from the output-coupler 116B of the waveguide 100B toward the human eye 214 at a first angle (zero degrees relative to the normal, in this example) are representative of blue light that is purposefully out-coupled by the output-coupler 116B of the waveguide 100B for viewing by the human eye 214.

In FIG. 4 the dashed thick arrowed lines directed from the output-coupler 116G of the waveguide 100G toward the human eye 214 at a first angle (zero degrees relative to the normal, in this example) are representative of green light that is purposefully out-coupled by the output-coupler 116G of the waveguide 100G for viewing by the human eye 214.

In FIG. 4 the dotted thick arrowed lines directed from the output-coupler 116R of the waveguide 100R toward the human eye 214 at a first angle (zero degrees relative to the normal, in this example) are representative of red light that is purposefully out-coupled by the output-coupler 116R of the waveguide 100R for viewing by the human eye 214.

In FIG. 4, the waveguide assembly 400 was shown and described as including the waveguide 100R for guiding red light within a red wavelength range, the waveguide 100G for guiding green light within a green wavelength range, and the waveguide 100B for guiding blue light within a blue wavelength range. In alternative embodiments, a first waveguide may guide both blue and green light, while a second waveguide guides the red light. In such an embodiment, an input-coupler would be configured to couple both blue and green light into a waveguide, and an output-coupler would be configured to couple both blue and green light out of the waveguide. This is just an example, as other variations are also possible and within the scope of the embodiments of the present technology.

Figure 5:
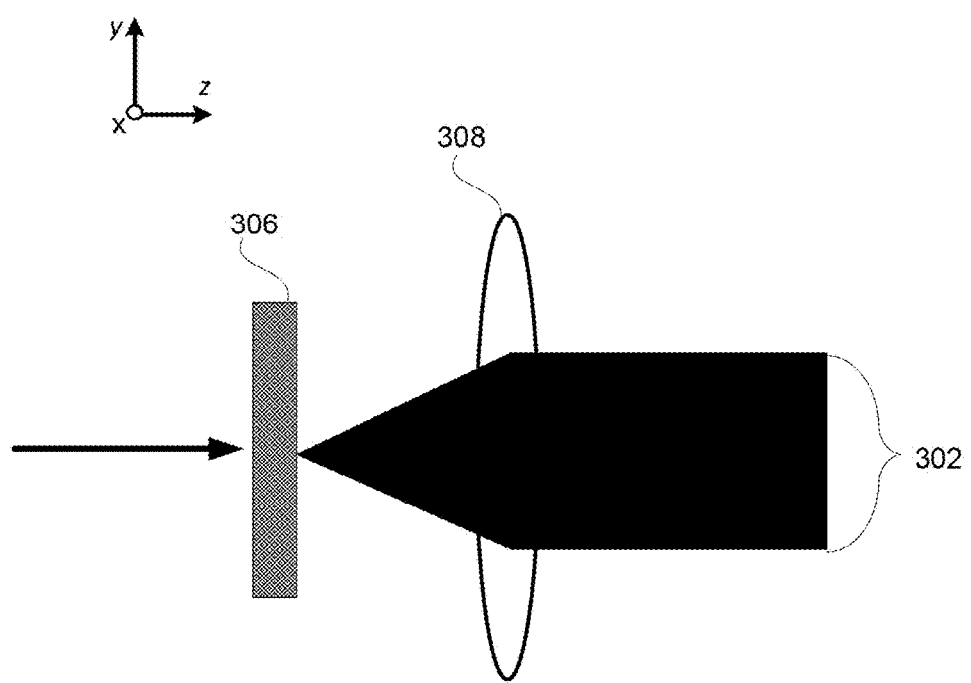
FIG. 5 is a diagram of a light pattern from one embodiment of an EPE and imaging lens, in which the EPE comprises a diffuser.

In one embodiment, the EPE 306 comprises one or more elements that diffuse light. FIG. 5 is a diagram of a light pattern from one embodiment of an EPE 306 and imaging lens 308, in which the EPE 306 comprises an element that diffuses light. Moreover, the exit pupil is expanded as a result of the diffusion. This EPE will be referred to herein as a "diffuser EPE." The diffuser EPE 306 may be used in the display system of FIG. 3A or 4, but is not limited thereto. In this example, a beam of light is depicted entering the diffuser EPE 306. This beam of light originates from a beam scan projector (not depicted in FIG. 5), in accordance with embodiments. There may be other optical elements between the beam scan projector and the EPE 306.

The diffuser EPE 306 diffuses (or scatters) the light, which is focused by imaging lens 308 resulting in an expanded exit pupil 302. FIG. 5 shows a view from the y-z perspective. In one embodiment, the light pattern from the diffuser EPE 306 is rotationally symmetric. Thus, a view from the x-z perspective may be similar to that depicted in FIG. 5.

In one embodiment, a diffuser EPE 306 is fabricating by lithographically etching a pattern into a substrate. The substrate could comprise a variety of materials, including but not limited to, silicon oxide, silicon, and germanium.

In one embodiment, the diffuser EPE 306 is a holographic diffuser. A holographic diffuser may be formed by recording a laser speckle pattern into some medium. For example, a photoresist may be exposed to a laser speckle pattern that results from illuminating a diffuser (e.g., ground glass) with a laser.

In one embodiment, the diffuser EPE 306 is a diffractive diffuser. In one embodiment, the diffractive diffusers is a computer-generated diffractive optical element (DOE). A diffractive diffuser may be formed using either binary- or gray-scale lithography fabrication methods, as two examples.

In one embodiment, the diffuser EPE 306 is a ground glass diffuser. The foregoing are just some examples of a diffuser EPE 306. Other types of diffusers may be used in a diffuser EPE 306.

Figure 6A:
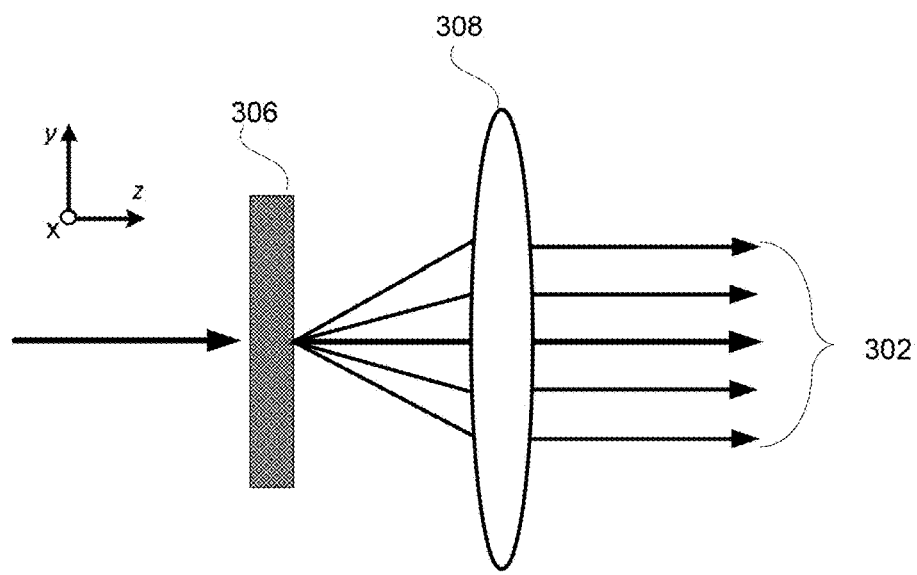
FIG. 6A is a diagram of one embodiment of an EPE and imaging lens, in which the EPE comprises a diffractive optical element (DOE).

FIG. 6A is a diagram of one embodiment of an EPE 306 and imaging lens 308, in which the EPE 306 comprises a diffractive optical element (DOE). Moreover, the exit pupil is expanded as a result of the light diffraction by the DOE. This EPE will be referred to herein as a "DOE EPE." The DOE EPE 306 may be used in the display system of FIG. 3A or 4, but is not limited thereto.

In this example, a beam of light is depicted entering the DOE EPE 306. This beam of light originates from a beam scan projector (not depicted in FIG. 6A), in accordance with embodiments. There may be other optical elements between the beam scan projector and the DOE EPE 306. The DOE EPE 306 diffracts the light into diffraction orders. In example in FIG. 6A, a zeroth, first and second diffraction order are depicted. Additional diffraction orders are not depicted so as to simplify the diagram. After leaving the imaging lens 308 an expanded exit pupil 302 results. FIG. 6A shows a view from the y-z perspective. In one embodiment, the light pattern from the DOE EPE 306 is rotationally symmetric. For example, the light pattern may be symmetric if the DOE EPE 306 is rotated about the optical axis. Thus, a view from the x-z perspective may be similar to that depicted in FIG. 6A.

Figure 6B:
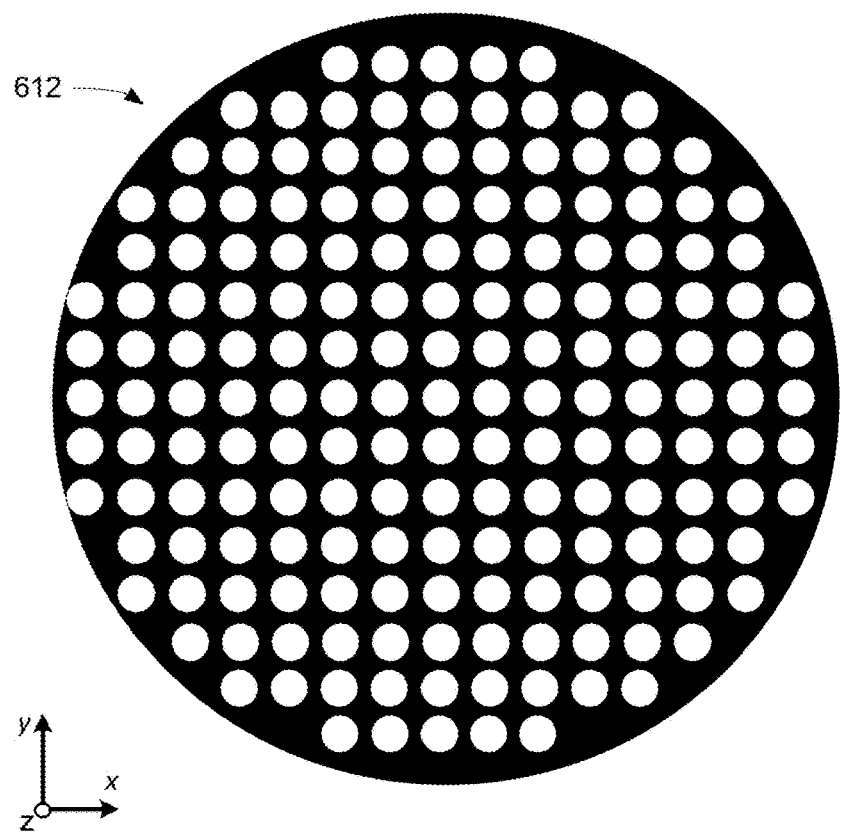
FIG. 6B is a diagram of one embodiment of a far-field pattern of the DOE EPE of FIG. 6A.

FIG. 6B is a diagram of one embodiment of a far-field pattern 612 of the DOE EPE 306 of FIG. 6A. FIG. 6B depicts many more diffractive orders than FIG. 6A. Also note that the light pattern in FIG. 6B may be somewhat idealized in that the light intensity is not necessarily the same for each of the wavelengths/colors.

Figure 7A:
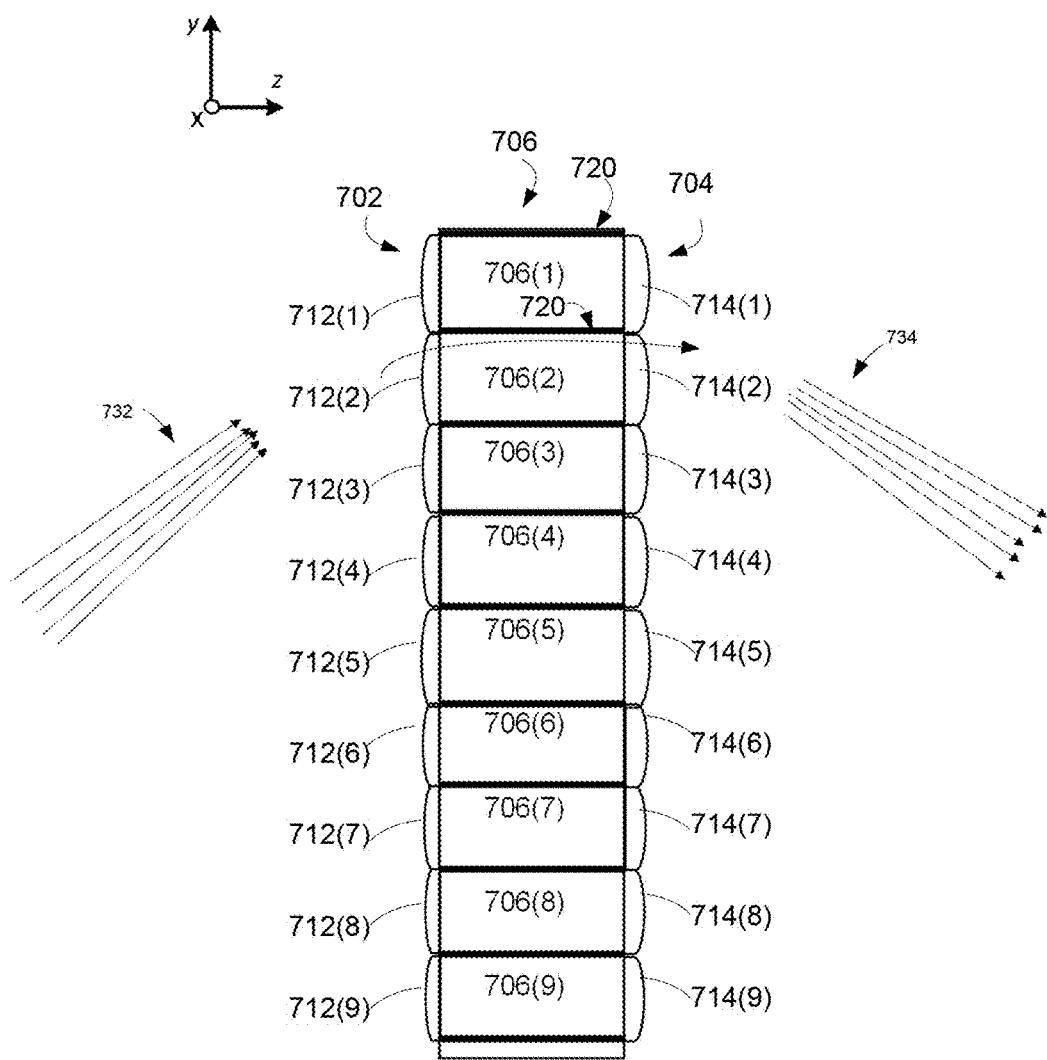
FIG. 7A is a diagram of one embodiment of small portion of an EPE, in which the EPE comprises a micro-lens array (MLA).

FIG. 7A is a diagram of one embodiment of small portion of an EPE 306, in which the EPE 306 comprises a micro-lens array (MLA). In this case, there are two MLAs 702, 704. Hence, the EPE 306 may be referred to as a dual MLA EPE 306. The dual MLA EPE 306 may be used in the display system of FIG. 3A or 4, but is not limited thereto.

The dual MLA EPE 306 has a body 706, a first MLA 702, and a second MLA 704. The body 706 has a number of cells 706(1)-706(9). The first MLA 702 has lenses 712(1)-712(9). Lenses 712(1)-712(9) may form an array in the x-y plane. The second MLA 702 has lenses 714(1)-714(9). Lenses 714(1)-714(9) may form an array in the x-y plane. Thus, there may be many more lenses in both the x- and y-direction for each MLA 702, 704.

Reference numeral 732 points to a number of arrows that represent a portion of the light beam from a scan beam projector 204 that are received by lens 712(2). Reference numeral 734 points to a number of arrows that represent a portion of the light beam that are output by lens 714(2). In one embodiment, this portion of the light beam corresponds to one "virtual pixel" in the image projected by the scan beam projector 204.

In one embodiment, each of the lenses 712 corresponds to one virtual pixel in the image projected by the scan beam projector 204. Likewise, each of the lenses 714 may correspond to one virtual pixel. Likewise, each of the cells 716 may correspond to one virtual pixel. FIG. 7A shows an example of a portion of the light beam 732 entering lens 712(2) passing through cell 706(2) and leaving lens 714(2). Thus, collectively lens 712(2), cell 706(2) and lens 714(2) may process the light associated with one virtual pixel. Other groups of one lens 712 from MLA 702, one cell 706 and one lens from MLA 704 may process the light associated with one virtual pixel in a similar manner. In FIG. 7A, the numbering 712(n), cell 706(n) and lens 714(n) is used to show which elements are associated with the same virtual pixel. In one embodiment, the image from the scan beam projector 204 comprises virtual pixels in an (x,y) array. In this case, each MLA could be an (x,y) array of lenses.

Note that it may be possible for there to be cross-talk between virtual pixels as the MLE EPE 306 processes the light. The MLA in FIG. 7A is configured in a manner to reduce or eliminate cross-talk between virtual pixels, in one embodiment. The cells 706 are configured, in one embodiment, to reduce or prevent light that enters a cell 706 from passing to another cell 706. For example, light that enters cell 706(2) may be prevented from going into cell 706(1), or 706(3). Note that there may be other cells adjacent to cell 706(2) that are not depicted in FIG. 7A. In one embodiment, the cells 706 are "blackened" on sides that physically separate the cells 706 to prevent light from escaping to an adjacent cell. The black lines between cells 706 represent a barrier that prevents cross-talk between cells 706. Two of the lines 720 that surround cell 706(1) are labeled.

In the embodiment of FIG. 7A, the lenses in MLA 704 have a different optical power than the lenses in MLA 702. This is represented by lenses 714 being slightly larger than lenses 712. In one embodiment, this results in a different NA for MLA 702 than for MLA 704. In one embodiment, the NA for MLA 704 is greater than the NA for MLA 702.

Figure 7B:
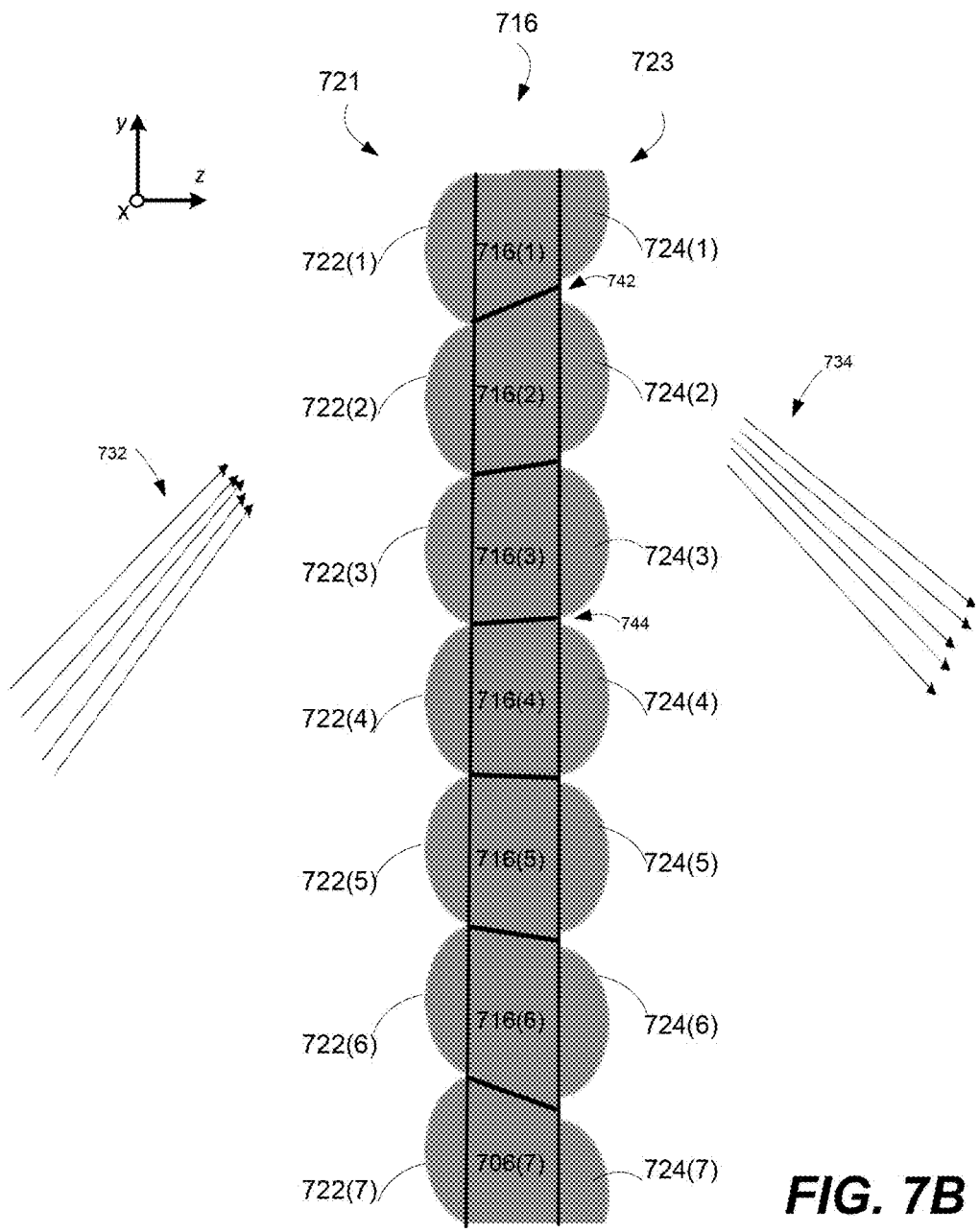
FIG. 7B depicts another embodiment of a dual MLA EPE.

FIG. 7B depicts another embodiment of a dual MLA EPE 306. The dual MLA EPE 306 may be used in the display system of FIG. 3A or 4, but is not limited thereto. The dual MLA EPE 306 has a body 706, a first MLA 702, and a second MLA 704. The body 706 may have a number of cells 706(1)-706(7). The first MLA 721 has lenses 722(1)-722(7). Lenses 722(1)-722(7) may reside in the x-y plane. The second MLA 723 has lenses 724(1)-724(7). Lenses 724(1)-724(7) may reside in the x-y plane. Thus, there may be many more lenses in both the x- and y-direction for each MLA.

As with FIG. 7A, reference numerals 732 and 734 represent light associated with one "virtual pixel" in the image projected by the scan beam projector 204. In this case, light associated with arrows 732 is input by lens 722(2), passes through cell 716(2), and out of lens 724(2). Other virtual pixels may be processed in a similar manner by other sets of a lens 722(n), cell 716(n), and lens 724(n), where "n" refers to one of the virtual pixels.

In this embodiment, lenses 722(1)-722(7) are periodic. By periodic it is meant that the distance between centers of adjacent lenses is uniform. However, lenses 724(1)-724(7) are not periodic. Thus, for lenses 724(1)-724(7), the distance between the centers of adjacent lenses 724 varies from one neighboring pair to another. Each of the lenses 724 in the second MLA 723 has the same diameter, in this example. Thus, the space between lenses 724 may vary based on the spatial location of the lenses. For example, there is a relatively large gap 742 between lens 724(1) and 724(2). The relatively large gap 742 results in a relatively large distance between the centers of the two lenses 724(1), 724(2). However, there is a relatively small gap 744 between lens 724(3) and 724(4). The relatively small gap 744 results in a relatively small distance between the centers of the two lenses 724(3), 724(4). Hence, the lenses 724 in MLA 723 are non-periodic. Note that the difference in gap size in FIG. 7B may be exaggerated to better illustrate the concept.

FIG. 7B just shows the y-z plane. Note that each MLA 721, 723 may extend in the x-y plane. The non-periodic nature of the lenses 724 is depicted with respect to the y-direction. The lenses 724 may be non-periodic with respect to a different direction parallel to the x-y plane. For example, the lenses 724 may be non-periodic with respect to the x-direction. The lenses 724 may be non-periodic with respect to a direction in the x-y plane other than the x-direction or the y-direction.

Another way of expressing the relationship between the lenses 722 in MLA 721 and lenses 724 in MLA 723 is that lenses 724 in MLA 723 are shifted relative to their counterpart in MLA 721. Moreover, the amount of shift varies depending on the location of the lenses. For example, lens 724(1) is shifted in the x-y plane relative to its counterpart lens 722(1) in MLA 721. Likewise, lens 724(3) is shifted in the x-y plane relative to its counterpart lens 722(3) in MLA 721. However, the amount of shift in these two cases is different. For example, the shift may be greater for the first example than for the second. This different amount of shift may result in a different angle of refraction. Since the angle of refraction depends on the location of the lenses in the x-y plane, this is one example of a spatially (in the x-y plane) dependent angle of refraction.

Note that although FIG. 7B depicts the lenses 724 on the output side of the EPE as being non-periodic, in one embodiment, the lenses 722 on the input side of the EPE are non-periodic but the lenses 724 on the output side of the EPE are periodic. In one embodiment, the lenses on both sides of the EPE are non-periodic. In this latter case, there may still be some shift between the corresponding lenses on each side of the EPE.

For ease of explanation, the lenses in MLA 721 and MLA 723 are depicted as being about the same size in FIG. 7B. However, the lenses in MLA 721 and MLA 723 could be a different size, similar to as discussed with respect to the embodiment of FIG. 7A. Also note that the difference in the size of the gaps 742, 744 may be exaggerated to better explain the principle.

Note that various features in FIGS. 7A and 7B may be combined in a dual MLA EPE 306. In one embodiment, a dual MLA EPE 306 has cells that prevent cross-talk between virtual pixels, has lenses with greater optical power on the output side than the input side, and has a non-periodic lens array on the output side.

Not all of these three features need to be present in a dual MLA EPE 306. In one embodiment, a dual MLA EPE 306 has cells that prevent cross-talk and has lenses with greater optical power on the output side than the input side (but does not have a non-periodic lens array). In one embodiment, a dual MLA EPE 306 has cells that prevent cross-talk and has a non-periodic lens array (but does not have lenses with greater optical power on the output side than the input side). In one embodiment, a dual MLA EPE 306 has lenses with greater optical power on the output side than the input side and has a non-periodic lens array on the output side (but does not have cells that prevent cross-talk).

In some embodiments, only one of these three features is present in a dual MLA EPE 306. In one embodiment, a dual MLA EPE 306 has cells that prevent cross-talk. In one embodiment, a dual MLA EPE 306 has lenses with greater optical power on the output side than the input side. In one embodiment, a dual MLA EPE 306 has a non-periodic lens array on the output side.

Figure 8:
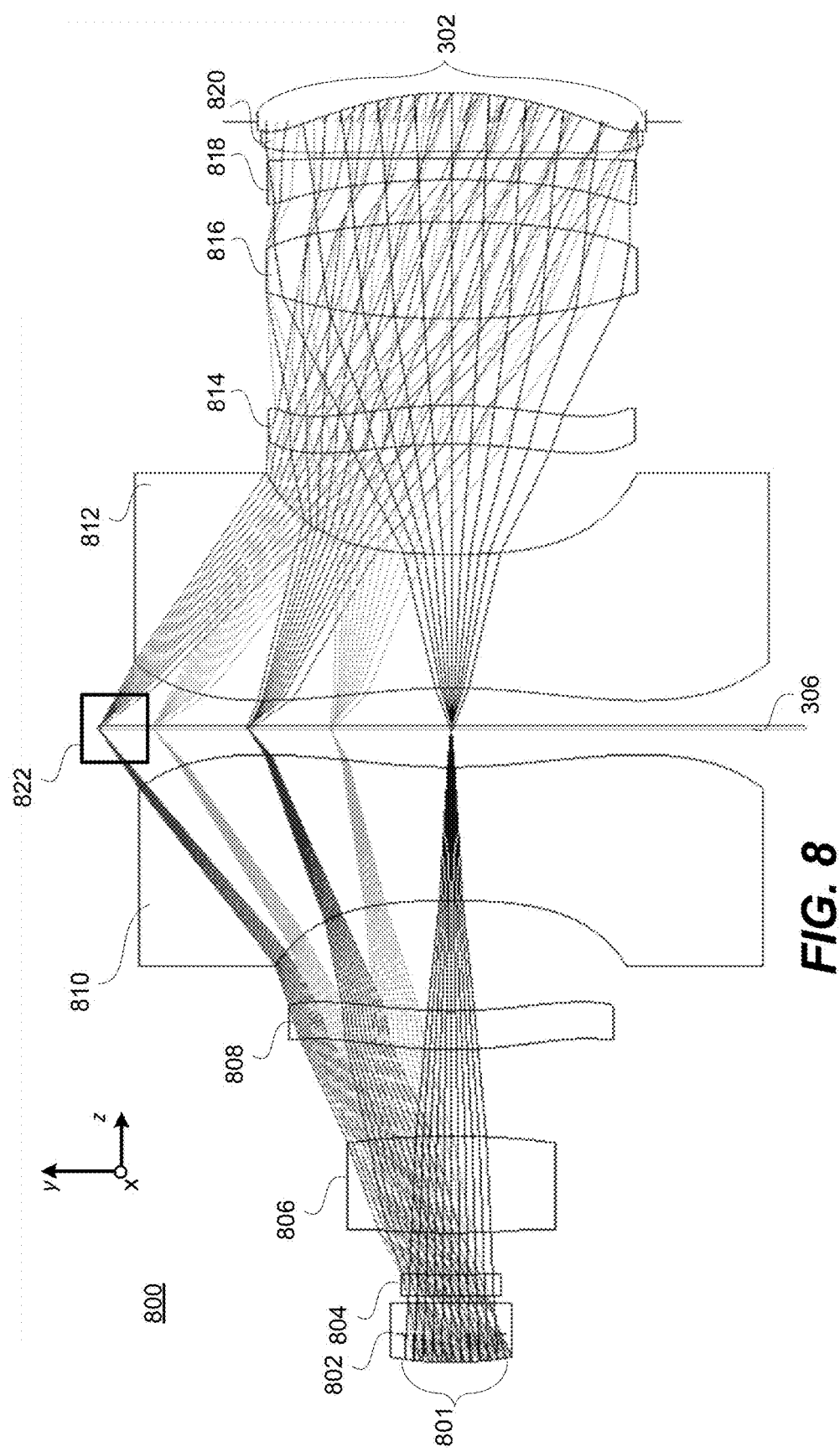
FIG. 8 is a diagram of one embodiment of an aspherical lens relay with an EPE at an intermediate image plane.

As noted above, the imaging lens 308 may comprise a number of optical elements. FIG. 8 is a diagram of one embodiment of an aspherical lens relay 800 with an EPE 306 at an intermediate image plane. The aspherical lens relay comprises lenses 802, 804, 806, 808, 810, 812, 814, 816, 818, and 820. The lenses 802, 804, 806, 808, 810, 812, 814, 816, 818, and 820 can be made of glass or optical plastic. In one embodiment, the lens relay corrects for chromatic effects, such as chromatic aberration. The EPE 306 is located on the intermediate image plane between lens 810 and 812.

A wide variety of different types of EPEs 306 can be used in the aspherical lens relay. In one embodiment, the EPE 306 in FIG. 8 comprises a diffuser EPE. In one embodiment, the EPE 306 in FIG. 8 comprises a DOE EPE. In one embodiment, the EPE 306 in FIG. 8 comprises a dual MLA EPE. Thus, the EPEs discussed with respect to FIGS. 5, 6A, 6B, 7A, and/or 7B could be used at the intermediate image plane in FIG. 8. However, the EPE 306 in the aspherical lens relay 800 is not limited to those embodiments.

FIG. 8 shows a y-z plane. The lenses in the aspherical lens relay are rotationally symmetric, in one embodiment. Thus, the aspherical lens relay may have a similar appearance in the x-z plane.

The aspherical lens relay 800 comprises an entrance pupil 801. This entrance pupil 801 may have about the same size as the exit pupil of the scan beam projector 204. However, it is not required that the entrance pupil 801 be about the same size as the exit pupil of the scan beam projector 204. The pupil size is expanded into expanded exit pupil 302 at the output of the aspherical lens relay 800. In one embodiment, it is the EPE 306 that performs the pupil expansion. For example, the aspherical lenses are not required to perform pupil expansion. As one example, the entrance pupil 801 could be about 1 mm. The expanded exit pupil 302 could be about 4 mm to 5 mm. However, these are just examples.

In one embodiment, the field of view (FOV) at the input of relay 800 is about the same as the FOV at the output of relay 800. As one example, the FOV could be about 60 degrees at both the input and the output. FIG. 8 depicts a region 822. In one embodiment, the portion of the MLA depicted in FIG. 7A or 7B can be used in region 822.

Figure 9:
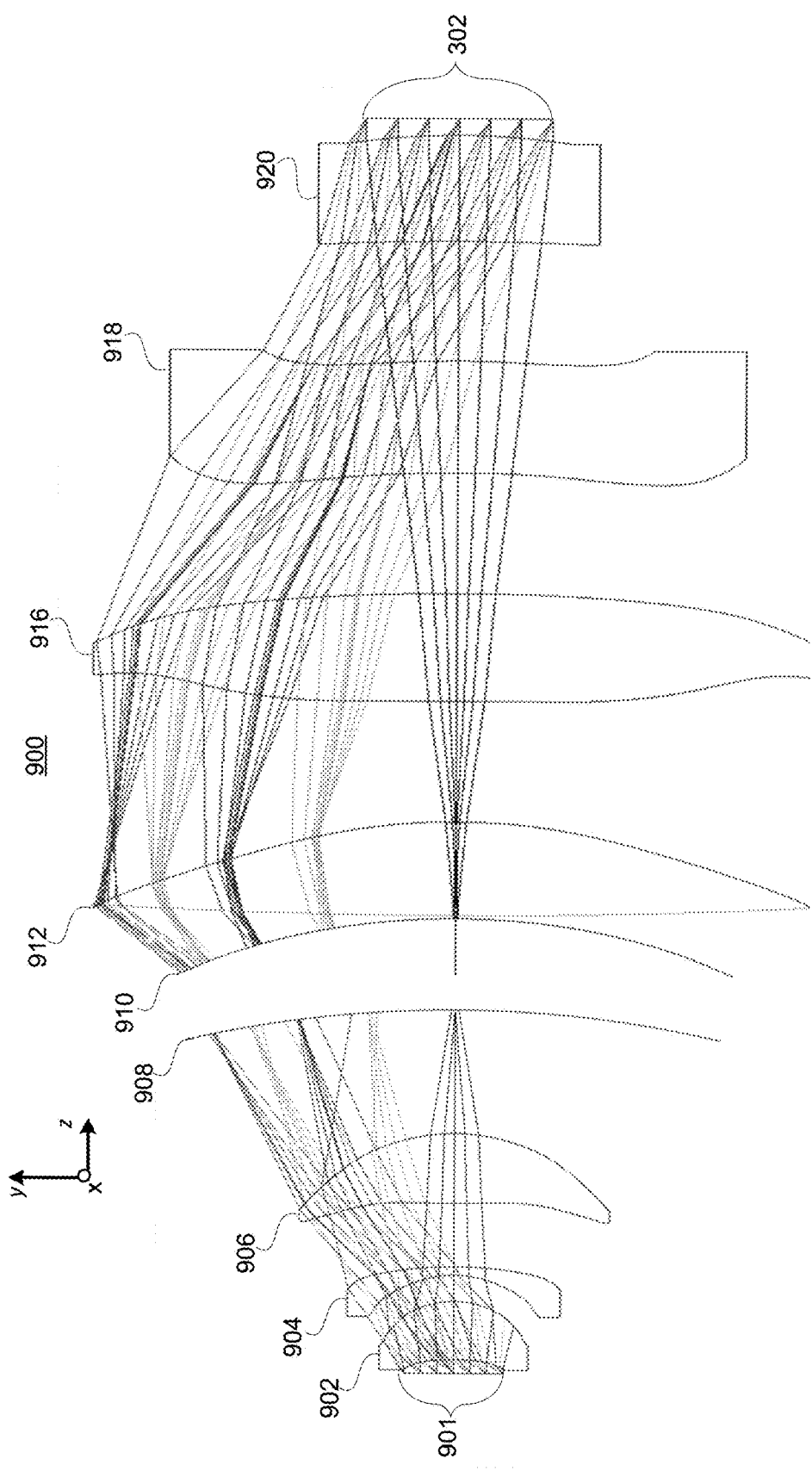
FIG. 9 is a diagram on one embodiment of an EPE that comprises a relay of refractive optical elements.

In one embodiment, the EPE 306 does not include a diffuser EPE, a DOE EPE, or a MLA EPE. Instead, the EPE 306 is formed from a relay of refractive optical elements having one or more aspherical lenses. FIG. 9 is a diagram on one embodiment of an EPE 306 that comprises a relay of refractive optical elements 900 having one or more aspherical lenses. The relay of refractive optical elements (ROE) 900 comprises lenses 902, 904, 906, 916, 918, and 920. The lenses 902, 904, 906, 916, 918, and 920 can be made of glass or optical plastic. Note that one or more of the lenses are aspherical lenses. FIG. 9 shows a y-z plane. The lenses in the lens relay 900 are rotationally symmetric in one embodiment. Thus, the lens relay 900 may have a similar appearance in the x-z plane.

Also depicted is a curved intermediate image plane, as represented by lines 908, 910, and 912. The image quality can be better with the relay of refractive optical elements 900 compared to using just a diffuser EPE, a DOE EPE, or a MLA EPE.

The relay of refractive optical elements 900 comprises an entrance pupil 901 and an expanded exit pupil 302. As one example, the entrance pupil 901 could be about 1 mm. The expanded exit pupil 302 could be about 3 mm. However, these are just examples, both the entrance pupil 901 and pupil 302 could be larger or smaller.

In one embodiment, the FOV at the input of the relay of ROE 900 is different from the FOV at the output. In one embodiment, the FOV is larger at the input of the relay of refractive optical elements 900 than at the output. As one example, the FOV at the input might be about 110 degrees and the FOV at the output might be about 40 degrees. However, these are just examples.

One variation of the relay of refractive optical elements 900 in FIG. 9 is to have a curved exit pupil expander at the curved intermediate image plane. This would allow for pupil magnification. Any of the exit pupil expanders described herein could be used at the curved intermediate image plane.

Note that an EPE 306 can include any combination of elements that diffuse, diffract, or refract light. Thus, in one embodiment, the EPE 306 includes an optical element that expands a pupil size by scattering (or diffusing) light and an optical element that expands a pupil size by diffracting light. In one embodiment, the EPE 306 includes an optical element that expands a pupil size by scattering (or diffusing) light and an optical element that expands a pupil size by refracting light. In one embodiment, the EPE 306 includes an optical element that expands a pupil size by diffracting light and an optical element that expands a pupil size by refracting light. In one embodiment, the EPE 306 includes an optical element that expands a pupil size by scattering (or diffusing) light, an optical element that expands a pupil size by diffracting light, and an optical element that expands a pupil size by refracting light.

Figure 10:
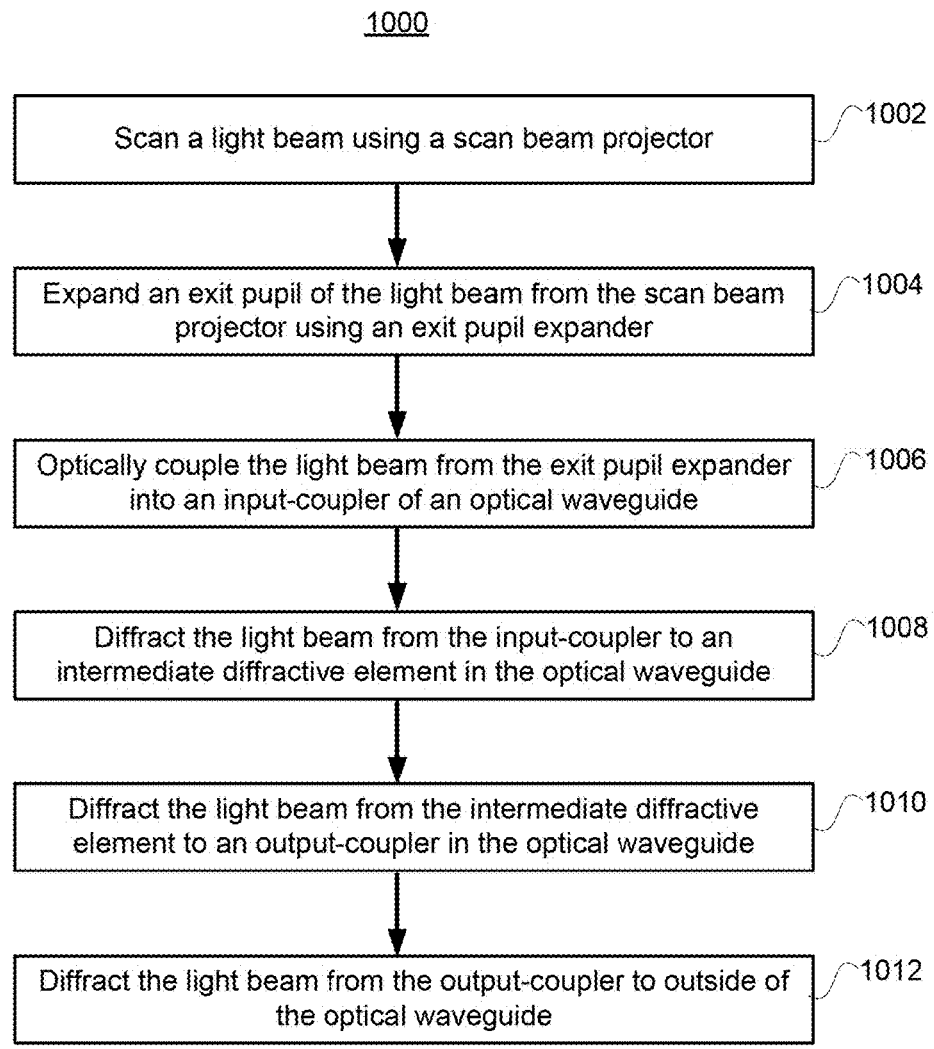
FIG. 10 is a flowchart of one embodiment of a process of providing an image in a display system having an EPE.

FIG. 10 is a flowchart of one embodiment of a process 1000 of providing an image in a display system 300 having an EPE 306. FIG. 10 is a high level flow diagram that is used to summarize methods according to various embodiments of the present technology. Such methods can be for use with a near eye or heads up display system that includes an EPE optically coupled between a scan beam projector and a waveguide.

Step 1002 includes scanning a light beam from a scan beam projector 204. Step 1002 may include forming an image have "virtual pixels."

Step 1004 includes expanding an exit pupil of the light beam from the scan beam projector 204 using an exit pupil expander 306. In one embodiment, the EPE 306 is a diffuser EPE. In one embodiment, the EPE 306 is a DOE EPE. In one embodiment, the EPE 306 is a dual MLA EPE. In one embodiment, the EPE 306 comprises a relay of aspherical lenses.

In one embodiment, step 1004 includes channeling portions of the light beam that correspond to pixels (e.g., virtual pixels) in the image through different physical sections (e.g., cells 706 in FIG. 7A or cells 716 in FIG. 7B) of the exit pupil expander (e.g., a dual MLA EPE 306) while preventing cross talk between adjacent pixels.

In one embodiment, step 1004 includes refracting the light beam from lenses in the microlens array (e.g., MLA 723 in FIG. 7B) at different angles depending on a spatial location of the lenses in the microlens array. For example, the lenses 724 in MLA 723 may be non-periodic such that the angle of refraction of one lens (e.g., lens 724(1)) is different from the angle of refraction of another lens (e.g., lens 724(3)). Thus, the angle of refraction may depend on the physical location (in, for example, an x-y plane) of the lens within the MLA. This may be referred to as a "spatially dependent refraction angle."

In one embodiment, step 1004 includes applying a first optical power to the light beam at an input of the exit pupil expander, and applying a second optical power to the light beam at an output of the exit pupil expanded. Note that the second optical power is not equal to the first optical power, in one embodiment. For example, lenses 712 in MLA 702 in FIG. 7A may have a different optical power than lenses 714 in MLA 704. Note that lenses 712 in MLA 702 in FIG. 7A may have a different curvature than lenses 714 in MLA 704, in one embodiment.

Step 1006 includes optically coupling the light beam from the exit pupil expander 306 into an input-coupler of an optical waveguide. The optical waveguide 100 depicted in FIG. 1A, 1B, 1C, or 4 could be used. For purpose of illustration, reference will be made in process 1000 to elements in FIGS. 1A, 1B, 1C, and 4. However, process 1000 is not limited to those examples.

Step 1008 includes diffracting the light beam from the input-coupler 112 to an intermediate diffractive element 114 in the optical waveguide. Note that in one embodiment, the waveguide 100 does not have an intermediate diffractive element 114. In this case, step 1008 is not performed. Instead, the light beam from the input-coupler 112 may be diffracted to an output-coupler in the optical waveguide 116.

Step 1010 includes diffracting the light beam from the intermediate diffractive element 114 to an output-coupler in the optical waveguide 116. Step 1010 may include expanding the pupil in either a vertical or a horizontal direction.

Step 1012 includes diffracting the light beam from the output-coupler 116 to outside of the optical waveguide 100. This may include diffracting the light beam into a human eye 214. Step 1012 may include expanding the pupil in either a vertical or a horizontal direction (the expansion may be horizontal if step 1010 was vertical expansion or vertical if step 1010 was horizontal expansion).

Figure 11:
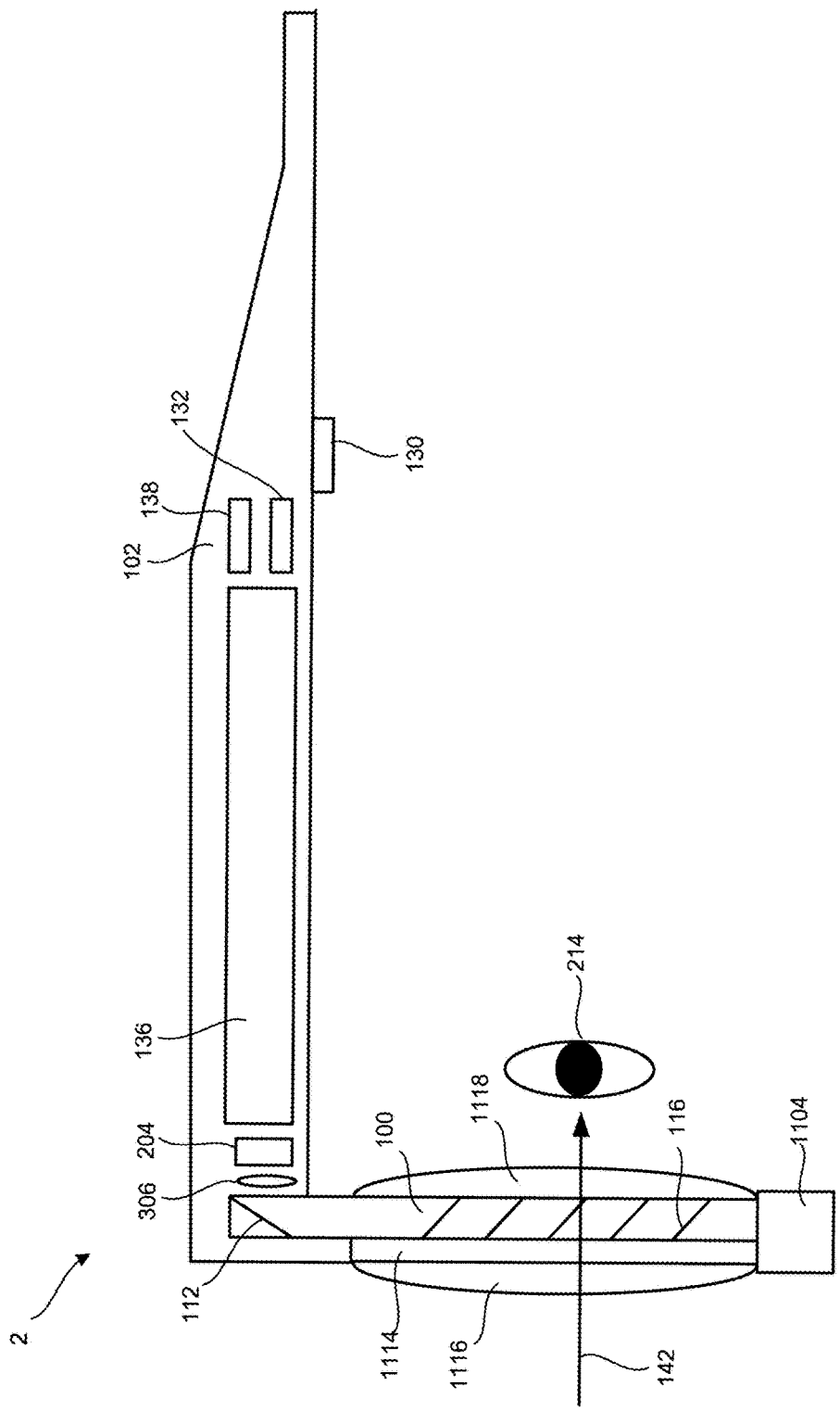
FIG. 11 depicts a top view of a portion of head mounted display device (HMD).

FIG. 11 depicts a top view of a portion of head mounted display device (HMD) 2, including a portion of the frame that includes temple 102 and nose bridge 1104. Various embodiments of EPEs 306 disclosed herein may be used in the HMD 2. Only the right side of head mounted display device 2 is depicted.

A portion of the frame of head mounted display device 2 will surround a display (that includes one or more lenses). In order to show the components of head mounted display device 2, a portion of the frame surrounding the display is not depicted. The display includes a waveguide 100, opacity filter 1114, see-through lens 1116 and see-through lens 1118. In one embodiment, opacity filter 1114 is behind and aligned with see-through lens 1116, waveguide 100 is behind and aligned with opacity filter 1114, and see-through lens 1118 is behind and aligned with light-guide optical element 112. See-through lenses 1116 and 1118 are standard lenses used in eye glasses and can be made to any prescription (including no prescription). In one embodiment, see-through lenses 1116 and 1118 can be replaced by a variable prescription lens. In some embodiments, head mounted display device 2 will include only one see-through lens or no see-through lenses. In another alternative, a prescription lens can go inside waveguide 100. Opacity filter 1114 filters out natural light (either on a per pixel basis or uniformly) to enhance the contrast of the virtual imagery. Waveguide 100 channels artificial light to the eye.

Mounted to or inside temple 102 is an image source, which (in one embodiment) includes scan beam projector 204 for projecting a virtual image and EPE 306 for expanding the pupil from the image from scan beam projector into waveguide 100. In one embodiment, there may also be one or more lenses between the scan beam projector 204 and waveguide 100.

Control circuits 136 provide various electronics that support the other components of head mounted display device 2. Inside, or mounted to temple 102, are ear phones 130, inertial and/or magnetic sensors 132 and temperature sensor 138. In one embodiment inertial and magnetic sensors 132 include a three axis magnetometer 132A, three axis gyro 132B and three axis accelerometer 132C. The inertial and/or magnetic sensors are for sensing position, orientation, and sudden accelerations of head mounted display device 2.

Scan beam projector 204 projects an image through EPE 306. Waveguide 100 transmits light from Scan beam projector 204 to the eye 214 of the user wearing head mounted display device 2. Waveguide 100 also allows light from in front of the head mounted display device 2 to be transmitted through waveguide 100 to eye 214, as depicted by arrow 142, thereby allowing the user to have an actual direct view of the space in front of head mounted display device 2 in addition to receiving a virtual image from scan beam projector 204 0. Thus, the walls of waveguide 100 may be see-through. Waveguide 100 includes input coupler 112 and output coupler 116. Optionally, waveguide 100 includes an intermediate element 114 (not depicted in FIG. 11).

Opacity filter 1114, which is aligned with waveguide 100, selectively blocks natural light, either uniformly or on a per-pixel basis, from passing through waveguide 100. In one embodiment, the opacity filter can be a see-through LCD panel, electro chromic film, PDLC (Polymer dispersed Liquid Crystal) or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 1114 can include a dense grid of pixels, where the light transmissivity of each pixel is individually controllable between minimum and maximum transmissivities. While a transmissivity range of 0-100% is ideal, more limited ranges are also acceptable. As an example, a monochrome LCD panel with no more than two polarizing filters is sufficient to provide an opacity range of about 50% to 99% per pixel, up to the resolution of the LCD. At the minimum of 50%, the lens will have a slightly tinted appearance, which is tolerable. 100% transmissivity represents a perfectly clear lens. An "alpha" scale can be defined from 0-100%, where 0% allows no light to pass and 100% allows all light to pass. The value of alpha can be set for each pixel by the opacity filter control circuit 224 described below.

A mask of alpha values can be used from a rendering pipeline, after z-buffering with proxies for real-world objects. When the system renders a scene for the augmented reality display, it takes note of which real-world objects are in front of which virtual objects. If a virtual object is in front of a real-world object, then the opacity should be on for the coverage area of the virtual object. If the virtual is (virtually) behind a real-world object, then the opacity should be off, as well as any color for that pixel, so the user will only see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs, to provide a wide field of view.

FIG. 11 only shows half of head mounted display device 2. A full head mounted display device 2 would include (where applicable) another set lenses, another opacity filter another waveguide 100, another scan beam projector 204, another lens, earphones, and temperature sensor.

In the above description and the FIGS. described therein, the waveguides 100 were typically described and shown as being planar waveguides that each include a pair of planar opposing main surfaces. In an alternative embodiment, one or both of the main surfaces of a waveguide could be non-planar, e.g., curved. In the above description and the FIGS. described therein, the waveguides 100 were typically described and shown as being parallel to one another, however that need not be the case.

In the above description, the scan beam projector 204 was described as outputting red, green and blue light corresponding to an image, and the waveguides 100 were described as transferring the red, green and blue light from the input-couplers 112 to the output-couplers 116 of the various waveguides 100, and more generally, from an entrance pupil to an exit pupil. However, it is also within the scope of the present technology that the light output by the scan beam projector 204 include alternative colours, such as, but not limited to, cyan, magenta and yellow, in which cases the input-couplers 112, output-couplers 116 would be designed for such alternative wavelength ranges. It is also within the scope of the present technology that more than three colors of light be output by the scan beam projector 204, e.g., the scan beam projector 204 can output red, green, blue and yellow light corresponding to an image. In this latter case, an additional waveguide can be used to guide the yellow light, or the yellow light can be guided within one of the waveguides that also guides one of the other colors. Other variations are possible and within the scope of the present technology.

In accordance with certain embodiments described herein, an apparatus comprises a scan beam projector configured to project a light beam, an optical waveguide and an exit pupil expander optically coupled between the scan beam projector and the optical waveguide. The optical waveguide includes a bulk-substrate, an input-coupler an output-coupler, and a diffractive optical element between the input-coupler and the output-coupler. The exit pupil expander is configured to couple the light beam into the input-coupler.

In accordance with certain embodiments described herein a method comprises scanning a light beam using a scan beam projector; expanding an exit pupil of the light beam from the scan beam projector using an exit pupil expander, optically coupling the light beam from the exit pupil expander into an input-coupler of an optical waveguide, diffracting the light beam from the input-coupler to an intermediate diffractive element in the optical waveguide, diffracting the light beam from the intermediate diffractive element to an output-coupler in the optical waveguide, and diffracting the light beam from the output-coupler to outside of the optical waveguide.

In accordance with certain embodiments described herein a see-through, near eye display system, comprises a light engine comprising a laser, a scanning mirror, and logic configured to scan a light beam from the laser with the scanning mirror; a pupil replicator including a bulk-substrate, an input-coupler an output-coupler, and a diffractive optical element between the input-coupler and the output-coupler, the output-coupler configured to deliver the light beam to an eye of a wearer of the see-through, near eye display system; and an exit pupil expander optically coupled between the scan beam projector and the pupil replicator, the exit pupil expander configured to couple the light beam into the input-coupler.

In accordance with certain embodiments described herein, an apparatus comprises a scan beam projector configured to project a light beam, an optical waveguide, and an exit pupil expander optically coupled between the scan beam projector and the optical waveguide. The exit pupil expander is configured to couple the light beam into the optical waveguide. The exit pupil expander comprises a dual microlens array comprising a first microlens array that is configured to receive the light beam in first lenses in a first plane and a second microlens array that is configured to output the light beam in second lenses in a second plane parallel to the first plane, wherein ones of the second lenses correspond to ones of the first lenses but are shifted relative to the first lenses in a direction parallel to the second plane.

In accordance with certain embodiments described herein, an apparatus comprises a scan beam projector configured to project a light beam, an optical waveguide, and an exit pupil expander optically coupled between the scan beam projector and the optical waveguide. The exit pupil expander is configured to couple the light beam into the optical waveguide. The exit pupil expander comprises a dual microlens array comprising a first microlens array that is configured to receive the light beam in first lenses in a first plane and a second microlens array that is configured to output the light beam in second lenses in a second plane parallel to the first plane, wherein the first set of lenses is periodic and the second set of lenses is non-periodic.

In accordance with certain embodiments described herein, an apparatus comprises a scan beam projector configured to project a light beam, an optical waveguide, and an exit pupil expander optically coupled between the scan beam projector and the optical waveguide. The exit pupil expander is configured to couple the light beam into the optical waveguide. The exit pupil expander comprises a dual microlens array comprising a first microlens array that is configured to receive the light beam and a second microlens array that is configured to output the light beam, wherein the second microlens array has a different optical power than the first microlens array.

In accordance with certain embodiments described herein, an apparatus comprises a scan beam projector configured to project a light beam, an optical waveguide, and an exit pupil expander optically coupled between the scan beam projector and the optical waveguide. The exit pupil expander comprises a diffuser EPE.

In accordance with certain embodiments described herein, an apparatus comprises a scan beam projector configured to project a light beam, an optical waveguide, and an exit pupil expander optically coupled between the scan beam projector and the optical waveguide. The exit pupil expander comprises a DOE EPE.

In accordance with certain embodiments described herein, an apparatus comprises a scan beam projector configured to project a light beam, an optical waveguide, and an exit pupil expander optically coupled between the scan beam projector and the optical waveguide. The exit pupil expander comprises a series of refractive optical elements that expand an exit pupil of the scan beam projector. The series of refractive optical elements are aspheric lenses in one embodiment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a scan beam projector configured to project a light beam;
an optical waveguide including a bulk-substrate, an input-coupler, an output-coupler, and a diffractive optical element between the input-coupler and the output-coupler; and
an exit pupil expander optically coupled between the scan beam projector and the optical waveguide, the exit pupil expander configured to couple the light beam from the scan beam projector into the input-coupler,
the exit pupil expander comprising a dual microlens array configured to expand an exit pupil associated with the scan beam projector,
wherein the dual microlens array comprises a first microlens array that is configured to receive the light beam in first lenses in a first plane and a second microlens array that is configured to output the light beam in second lenses in a second plane parallel to the first plane, wherein the first lenses are periodic and the second lenses are non-periodic.

2. The apparatus of claim 1, wherein the diffractive optical element further comprises a first diffractive optical element and a second diffractive optical element, wherein the input-coupler comprises the first diffractive optical element configured to diffract the light beam to the second diffractive optical element, wherein the second diffractive optical element is configured to diffract the light beam to the output-coupler, wherein at least one of the first diffractive optical element or the second diffractive optical element is configured to expand the light beam in at least one direction.

3. The apparatus of claim 1, further comprising an opacity filter aligned with the optical waveguide, the opacity filter is configured to selectively block natural light from passing through the optical waveguide.

4. The apparatus of claim 1, wherein the first microlens array comprises first lenses and the second microlens array comprises second lenses that do not match the first lenses.

5. A method comprising:
scanning a light beam using a scan beam projector;
expanding an exit pupil of the light beam from the scan beam projector using an exit pupil expander, comprising channeling portions of the light beam that correspond to virtual pixels in the light beam through different physical sections of the exit pupil expander while preventing cross talk between adjacent virtual pixels;
optically coupling the light beam from the exit pupil expander into an input-coupler of an optical waveguide;
diffracting the light beam from the input-coupler to an intermediate diffractive element in the optical waveguide;
diffracting the light beam from the intermediate diffractive element to an output-coupler in the optical waveguide; and
diffracting the light beam from the output-coupler to outside of the optical waveguide.

6. The method of claim 5, wherein the exit pupil expander comprises a microlens array, wherein expanding the exit pupil of the light beam from the scan beam projector using the exit pupil expander comprises:
refracting the light beam from lenses in the microlens array at different angles depending on a spatial location of the lenses in the microlens array.

7. The method of claim 5, wherein expanding the exit pupil of the light beam from the scan beam projector using the exit pupil expander comprises:
applying a first optical power to the light beam at an input of the exit pupil expander; and
applying a second optical power to the light beam at an output of the exit pupil expander, the second optical power is not equal to the first optical power.

8. A see-through, near eye display system, comprising:
a light engine comprising a laser, a scanning mirror, and logic configured to scan a light beam from the laser with the scanning mirror;
a pupil replicator including a bulk-substrate, an input-coupler, an output-coupler, and a diffractive optical element between the input-coupler and the output-coupler, the output-coupler configured to deliver the light beam to an eye of a wearer of the see-through, near eye display system; and
an exit pupil expander optically coupled between the light engine and the pupil replicator, the exit pupil expander configured to couple the light beam from the light engine into the input-coupler,
the exit pupil expander comprising a dual microlens array having a first microlens array configured to receive the light beam in first lenses in a first plane and a second microlens array configured to output the light beam in second lenses in a second plane parallel to the first plane, wherein ones of the second lenses have a different numerical aperture from ones of the first lenses.

9. The see-through, near eye display system of claim 8, wherein the dual microlens array is configured to provide a spatially dependent refraction angle.

10. The see-through, near eye display system of claim 8, wherein the dual microlens array comprises a body having a first side and a second side, the body comprising cells configured to channel light from ones of the first lenses to corresponding ones of the second lenses, the cells configured to prevent cross-talk between adjacent cells.

11. An apparatus, comprising:
a scan beam projector configured to project a light beam;
an optical waveguide including a bulk-substrate, an input-coupler, an output-coupler, and a diffractive optical element between the input-coupler and the output-coupler; and
an exit pupil expander optically coupled between the scan beam projector and the optical waveguide, the exit pupil expander configured to couple the light beam from the scan beam projector into the input-coupler,
the exit pupil expander comprising a series of aspherical refractive optical elements configured to expand an exit pupil of the scan beam projector.

12. An apparatus, comprising:
a scan beam projector configured to project a light beam;
an optical waveguide including a bulk-substrate, an input-coupler, an output-coupler, and a diffractive optical element between the input-coupler and the output-coupler;

a series of refractive optical elements comprising a first set of lenses and a second set of lenses, the series of refractive optical elements correcting for chromatic aberration; and
an exit pupil expander optically coupled between the scan beam projector and the optical waveguide, the exit pupil expander optically coupled between the first set and the second set of lenses, the exit pupil expander configured to couple the light beam from the scan beam projector into the input-coupler.

13. A method comprising:
scanning a light beam using a scan beam projector;
expanding an exit pupil of the light beam from the scan beam projector using an exit pupil expander, comprising:
  applying a first optical power to the light beam at an input of the exit pupil expander; and
  applying a second optical power to the light beam at an output of the exit pupil expander, the second optical power is not equal to the first optical power;
optically coupling the light beam from the exit pupil expander into an input-coupler of an optical waveguide;
diffracting the light beam from the input-coupler to an intermediate diffractive element in the optical waveguide;
diffracting the light beam from the intermediate diffractive element to an output-coupler in the optical waveguide; and
diffracting the light beam from the output-coupler to outside of the optical waveguide.

14. The method of claim 13, further comprising:
propagating the light beam from the input-coupler through the optical waveguide to an output coupler of the optical waveguide; and
optically coupling the light beam through output coupler to outside of the optical waveguide.

15. A see-through, near eye display system, comprising:
a light engine comprising a laser, a scanning mirror, and logic configured to scan a light beam from the laser with the scanning mirror;
a pupil replicator including a bulk-substrate, an input-coupler an output-coupler, and a diffractive optical element between the input-coupler and the output-coupler, the output-coupler configured to deliver the light beam to an eye of a wearer of the see-through, near eye display system; and
an exit pupil expander optically coupled between the light engine and the pupil replicator, the exit pupil expander configured to couple the light beam from the light engine into the input-coupler, the exit pupil expander comprising a dual microlens array having:
  a body having a first side and a second side;
  a first microlens array having first lenses disposed on the first side; and
  a second microlens array having second lenses disposed on the second side, the body comprising cells configured to channel light from ones of the first lenses to corresponding ones of the second lenses, the cells configured to prevent cross-talk between adjacent cells.

16. An apparatus, comprising:
a scan beam projector configured to project a light beam;
an optical waveguide including a bulk-substrate, an input-coupler, an output-coupler, and a diffractive optical element between the input-coupler and the output-coupler; and
an exit pupil expander optically coupled between the scan beam projector and the optical waveguide, the exit pupil expander configured to couple the light beam from the scan beam projector into the input-coupler,
the exit pupil expander comprising a dual microlens array configured to expand an exit pupil associated with the scan beam projector, wherein the dual microlens array comprises:
  a first microlens array that is configured to receive the light beam in first lenses in a first plane; and
  a second microlens array that is configured to output the light beam in second lenses in a second plane parallel to the first plane, wherein ones of the second lenses correspond to ones of the first lenses but are shifted relative to the first lenses in a direction parallel to the second plane.

17. An apparatus, comprising:
a scan beam projector configured to project a light beam;
an optical waveguide including a bulk-substrate, an input-coupler, an output-coupler, and a diffractive optical element between the input-coupler and the output-coupler; and
an exit pupil expander optically coupled between the scan beam projector and the optical waveguide, the exit pupil expander configured to couple the light beam from the scan beam projector into the input-coupler,
the exit pupil expander comprising a dual microlens array configured to expand an exit pupil associated with the scan beam projector, wherein the dual microlens array comprises:
  a first microlens array that is configured to receive the light beam; and
  a second microlens array that is configured to output the light beam, wherein the second microlens array has a different optical power than the first microlens array.

18. A see-through, near eye display system, comprising:
a light engine comprising a laser, a scanning mirror, and logic configured to scan a light beam from the laser with the scanning mirror;
a pupil replicator including a bulk-substrate, an input-coupler an output-coupler, and a diffractive optical element between the input-coupler and the output-coupler, the output-coupler configured to deliver the light beam to an eye of a wearer of the see-through, near eye display system; and
an exit pupil expander optically coupled between the light engine and the pupil replicator, the exit pupil expander configured to couple the light beam from the light engine into the input-coupler;
wherein the exit pupil expander comprises a relay of aspherical lenses that expand an exit pupil of the light engine.

* * * * *